United States Patent
Talarico et al.

(10) Patent No.: US 10,623,051 B2
(45) Date of Patent: Apr. 14, 2020

(54) FREQUENCY HOPPING PATTERN FOR UNLICENSED INTERNET-OF-THINGS SYSTEM

(71) Applicant: Intel IP Corporation, Santa Clara, CA (US)

(72) Inventors: Salvatore Talarico, Sunnyvale, CA (US); Huaning Niu, Milpitas, CA (US); Wenting Chang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/163,160

(22) Filed: Oct. 17, 2018

(65) Prior Publication Data

US 2019/0052308 A1    Feb. 14, 2019

Related U.S. Application Data

(60) Provisional application No. 62/574,087, filed on Oct. 18, 2017, provisional application No. 62/588,643, (Continued)

(51) Int. Cl.
| | |
|---|---|
| *H04B 1/00* | (2006.01) |
| *H04B 1/7143* | (2011.01) |
| *H04B 1/7136* | (2011.01) |
| *H04W 88/06* | (2009.01) |
| *H04W 4/70* | (2018.01) |

(Continued)

(52) U.S. Cl.
CPC ......... *H04B 1/7143* (2013.01); *H04B 1/7136* (2013.01); *H04W 4/70* (2018.02); *H04W 4/80* (2018.02); *H04W 16/14* (2013.01); *H04W 76/27* (2018.02); *H04W 88/06* (2013.01); *H04W 80/02* (2013.01)

(58) Field of Classification Search
CPC ............ H04W 5/0012; H04W 5/0005; H04W 1/0026; H04B 1/713; H04B 17/309; H04B 1/7143; H04L 5/0012; H04L 5/0005; H04L 1/0026
USPC .......................... 375/132, 130, 134; 370/339
See application file for complete search history.

(56) References Cited

U.S. PATENT DOCUMENTS

| | | | |
|---|---|---|---|
| 2003/0092386 A1* | 5/2003 | Miklos | H04W 74/0808 455/41.1 |
| 2019/0115964 A1* | 4/2019 | Yum | H04B 17/24 |

(Continued)

*Primary Examiner* — Khai Tran
(74) *Attorney, Agent, or Firm* — Kowert, Hood, Munyon, Rankin & Goetzel, P.C.

(57) ABSTRACT

The disclosure provides design of a frequency hopping sequence for an unlicensed IoT system operating in unlicensed spectrum. According to some embodiments, an apparatus for generating a frequency hopping sequence in an unlicensed Internet-of-Things (IoT) system includes baseband circuitry to generate a frequency hopping sequence by conducting a permutation operation based on a physical cell identifier (PCI) and a system frame number (SFN), and to select a channel within an unlicensed spectrum according to the frequency hopping sequence. In some embodiments, the input of the permutation operation is obtained from the SFN or from the SFN and the PCI. In some embodiments, the control of the permutation operation is a function of the PCI and/or the SFN. In some embodiments, the control of the permutation operation is generated using a pseudorandom number generator with the PCI as a seed.

20 Claims, 12 Drawing Sheets

Related U.S. Application Data filed on Nov. 20, 2017, provisional application No. 62/591,061, filed on Nov. 27, 2017.

(51) Int. Cl.
*H04W 4/80* (2018.01)
*H04W 76/27* (2018.01)
*H04W 16/14* (2009.01)
*H04W 80/02* (2009.01)

(56) References Cited

U.S. PATENT DOCUMENTS

2019/0149190 A1* 5/2019 Liu ................... H04B 1/7143
2019/0158139 A1* 5/2019 Talarico ............ H04B 1/7143

* cited by examiner

FREQUENCY HOPPING PATTERN FOR UNLICENSED INTERNET-OF-THINGS SYSTEM

REFERENCE TO RELATED APPLICATIONS

This application claims the benefit of priority under 35 U.S.C. 119(e) of U.S. Provisional Patent Application Ser. No. 62/574,087, filed Oct. 18, 2017, entitled "Frequency Hopping Patterns for Unlicensed Enhanced Machinetype Communications (EMTC-U) Systems", U.S. Provisional Patent Application Ser. No. 62/588,643, filed Nov. 20, 2017, entitled "Frequency Hopping Pattern for Enhanced Machine Type Communication-Unlicensed (EMTC-U) Systems", and U.S. Provisional Patent Application Ser. No. 62/591, 061, filed Nov. 27, 2017, entitled "Frequency Hopping Pattern for Enhanced Machine Type Communication-Unlicensed (EMTC-U) Systems", the contents of which are incorporated herein by reference in their entirety.

TECHNICAL FIELD

This disclosure is related generally to operation of an Internet-of-Things (IoT) system in unlicensed spectrum, and more specifically to design of a frequency hopping sequence for an unlicensed IoT system operating in unlicensed spectrum.

BACKGROUND ART

Internet-of-Things (IoT) is envisioned as significantly important technology having great potential, and may change our daily life entirely by enabling connectivity among a huge number of devices. IoT has wide applications in various scenarios, including smart cities, smart environment, smart agriculture and smart health systems. The Third Generation Partnership Project (3GPP) standards have standardized two designs to support IoT services, i.e., enhanced Machine Type Communication (eMTC) and Narrowband IoT (NB-IoT). As user equipments (UEs) for eMTC and NB-IoT UEs will be deployed in huge numbers, lowering the cost of the UEs is important for implementation of IoT, and low power consumption is desirable to extend life time of the battery. In addition, since there are substantial use cases of devices deployed deep inside buildings, there is a requirement of coverage enhancement. Accordingly, eMTC and NB-IoT techniques are designed to ensure that the UEs have low cost, low power consumption and enhanced coverage.

BRIEF DESCRIPTION OF THE DRAWINGS

Other features and advantages of the disclosure will become apparent in the following detailed description of the embodiments with reference to the accompanying drawings, of which.

DESCRIPTION OF THE EMBODIMENTS

Figure 1:
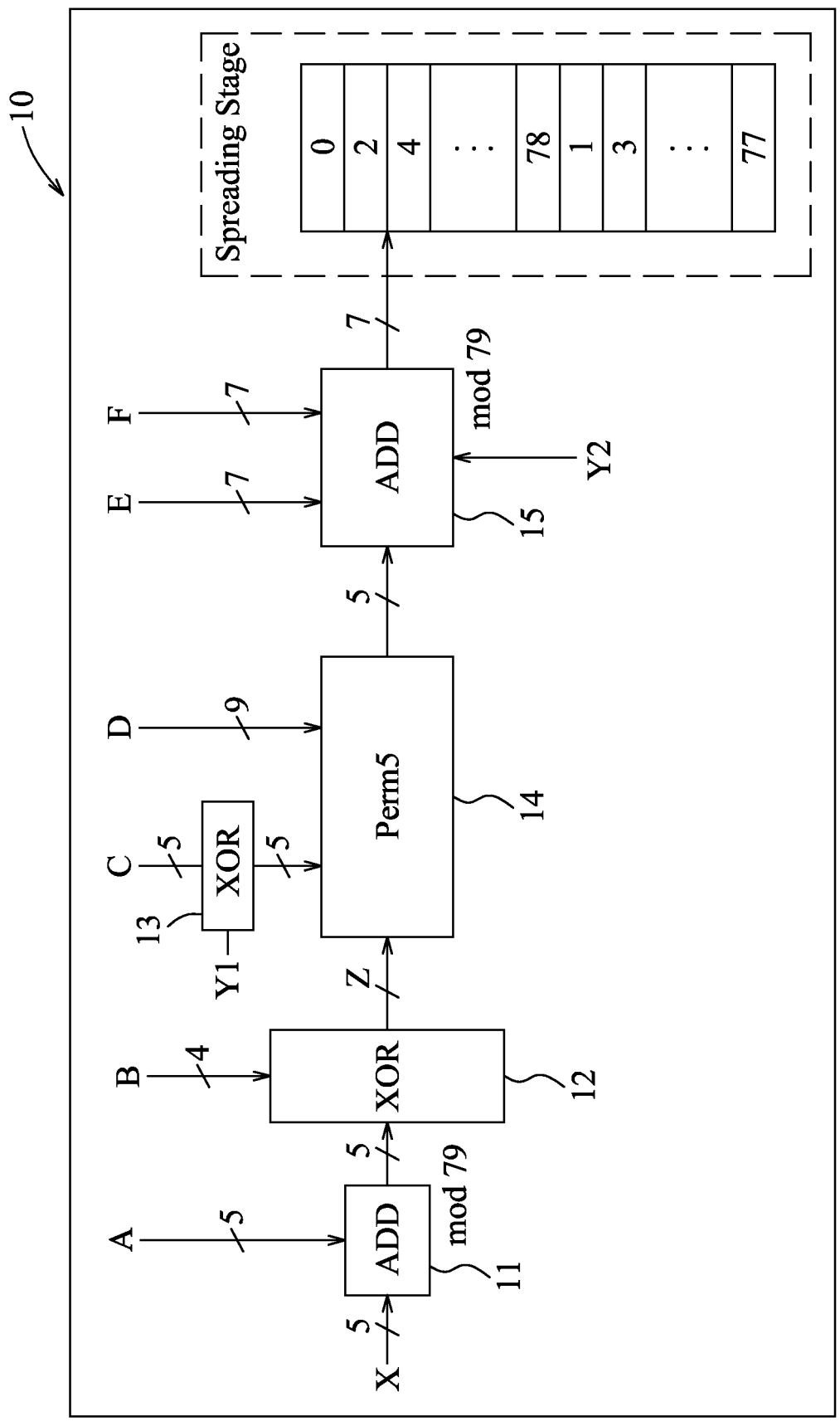
FIG. 1 illustrates a Bluetooth® frequency hopping selection kernel.

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology used herein is for the purpose of describing particular examples only and is not intended to be limiting.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the expressions "in one embodiment," "in some embodiments," and "in various embodiments" in various places in the specification are not necessarily all referring to the same embodiment.

The following description and the accompanying drawings provide specific embodiments to enable those skilled in the art to embody the concept of this disclosure. A number of examples are described with reference to 3GPP (Third Generation Partnership Project) communication systems. Embodiments herein are related to the long term evolution (LTE) systems operating in unlicensed spectrum, specifically to Internet-of-Things (IoT) systems operating in unlicensed spectrum. It will be understood that principles of the embodiments may be applicable in other types of communication systems, such as Wi-Fi® or Wi-Max networks, Bluetooth® or other personal-area networks, Zigbee or other home-area networks, and the like, without limitation, unless specifically stated in this disclosure.

The 3GPP standards have standardized two designs to support IoT services, i.e., enhanced Machine Type Communication (eMTC) and Narrowband IoT (NB-IoT). Release 13 (Rel-13) of the 3GPP standards supports eMTC and NB-IoT both operating in licensed spectrum. On the other hand, scarcity of licensed spectrum in low frequency band results in a deficit in data rate. Thus, there is emerging interests in the operation of LTE systems in unlicensed spectrum.

Potential LTE operation in unlicensed spectrum includes, but is not limited to Carrier Aggregation based on Licensed Assisted Access (LAA) system and/or Enhanced LAA (eLAA) system, LTE operation in the unlicensed spectrum via dual connectivity (DC), and standalone LTE system in the unlicensed spectrum, where LTE-based technology solely operates in unlicensed spectrum without requiring an "anchor" in licensed spectrum, called MulteFire.

To extend the benefits of LTE IoT designs into unlicensed spectrum, MulteFire 1.1 is expected to specify the design for Unlicensed-IoT (U-IoT). The current technology falls in the scope of the U-IoT systems, with focus on eMTC-based U-IoT design. It should be noted that similar approaches can be used in NB-IoT-based U-IoT design as well.

The unlicensed frequency band of interest in embodiments of this disclosure is the 2.4 GHz band. For global availability, the design should abide by the regulations in different regions, e.g., the regulations given by Federal Communications Commission (FCC) in the United States and the regulations given by European Telecommunications Standards Institute (ETSI) in Europe. Based on these regulations, frequency hopping is more appropriate than other forms of modulations, due to its more relaxed power spectrum density (PSD) limitation and its ability of co-existence with other unlicensed band technology such as Bluetooth® and Wi-Fi®. Specifically, frequency hopping has no PSD limit while other wide band modulations have PSD limit of 10 dBm/MHz in regulations given by ETSI. The low PSD limit would result in limited coverage. Thus, embodiments of this disclosure focus on the U-IoT with frequency hopping.

Since, in eMTC-U (eMTC in unlicensed spectrum), the data channel hops from one channel to another, it is advisable to opportunely design the hopping pattern, such that primary cell (PCell), secondary cell(s) (SCell) and also UEs might be able to know a hopping channel to which the system might hop from a set of minimum information, even though they might not be able to used the hopping channel due to collisions with incumbent technologies.

Various embodiments of this disclosure provide design of a frequency hopping sequence for an unlicensed IoT system, especially an eMTC-U system, operating in unlicensed spectrum. The frequency hopping sequence depends also on success in carrier sensing procedure.

In LTE, currently there is no concept of frequency hopping sequence since the LTE system does not need to operate in a frequency hopping spread spectrum manner. However, since, in the eMTC-U system, the design of frequency hopping sequence should abide by the regulations in different regions, frequency hopping is the most appropriate form of modulation, due to its more relaxed PSD limitation and its ability of co-existence with other unlicensed band technology, such as Bluetooth® and Wi-Fi®.

In Bluetooth® technology, a signal rapidly hops among a pre-defined set of channels in a pre-defined order in order to combat narrowband interference and to reduce likelihood of being jammed. In this technology, the frequency hopping sequence is a function of a part of the medium access control (MAC) address and the clock (27 bits that we refer to as CLK27-1) of the device. Specifically, for the MAC address having a total of 28 bits (referred to as $A_0$ to $A_{27}$), a lower address part (LAP) field which is a lower part of the MAC address and contains 24 bits, and an upper address part (UAP) field which is an upper part of the MAC address and contains 8 bits are used in the function for generating the frequency hopping sequence. For example, the clock has 27 bits (referred to as $CLK_1$ to $CLK_{27}$). The frequency hopping sequence is generated based on a Bluetooth® frequency hopping selection kernel 10 as illustrated in FIG. 1.

In FIG. 1, the Bluetooth® frequency hopping selection kernel 10 is a non-linear function having a first ADD operation 11, a first XOR operation 12, a second XOR operation 13, a permutation operation 14 (e.g., a Perm5 operation) and a second ADD operation 15.

The first ADD operation 11 is a 5-bit adder and has two inputs X and A. The first ADD operation 11 is followed by mod 79 operation. The input X is a 5-bit binary number directly derived from the clock bits ($CLK_{6, 5, 4, 3, 2}$), and can be expressed by $X=CLK_{6-2}$. The input A is a 5-bit binary number obtained by implementing exclusive or (XOR) operation on the MAC address bits ($A_{27, 26, 25, 24, 23}$) with the clock bits ($CLK_{25, 24, 23, 22, 21}$), and can be expressed by $A=A_{27-23} \oplus CLK_{25-21}$.

The first XOR operation 12 has two inputs, i.e., an input B and an output of the first ADD operation 11 followed by mod 79 operation, and outputs parameter Z. The input B is a 4-bit binary number directly derived from the MAC address bits ($A_{22, 21, 20, 19}$), and can be expressed by $B=A_{22-19}$.

The second XOR operation 13 has two inputs C and Y1, and a 4-bit output. The input C is a 5-bit binary number obtained by implementing XOR operation on the MAC address bits ($A_{8, 6, 4, 2, 0}$) with the clock bits ($CLK_{20, 19, 18, 17, 16}$), and can be expressed by $C=A_{8,6,4,2,0} \oplus CLK_{20-16}$. The input Y1 is a 5-bit binary number derived from the clock bit ($CLK_1$). In particular, the clock bit ($CLK_1$) is duplicated into 5 bits to be suitable for the second XOR operation 13 that is a 5-bit XOR operation.

Figure 2:
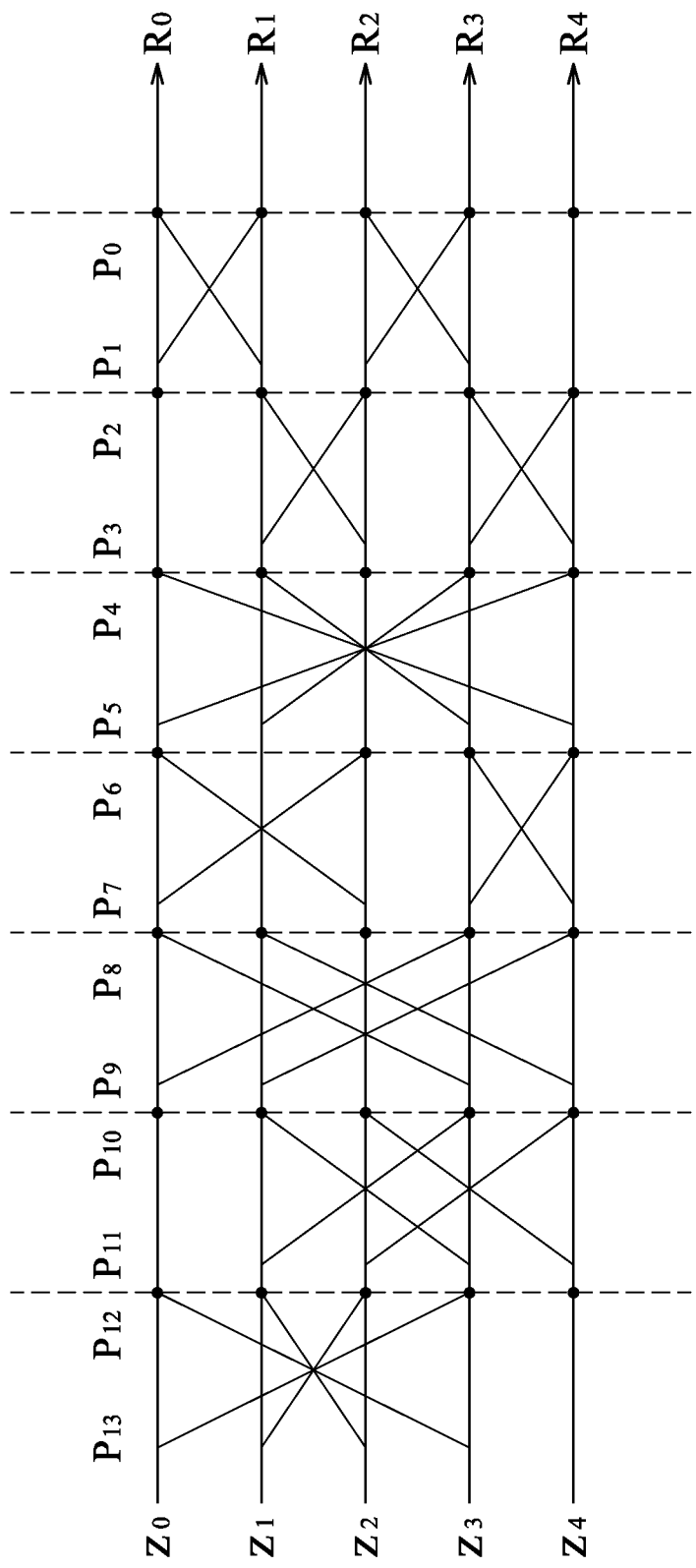
FIG. 2 illustrates an internal structure of a permutation operation included in the Bluetooth® frequency hopping selection kernel of FIG. 1.

The Perm5 operation 14 has an input, i.e., the parameter Z outputted by the first XOR operation 12, and is controlled by a 14-bit parameter P ($P_{13}$ to $P_0$) (see FIG. 2). The 14-bit parameter P includes an output of the second XOR operation 13 and a 9-bit binary number D. The 9-bit binary number D is obtained by implementing XOR operation on the MAC address bits ($A_{18}$ to $A_{10}$) with the clock bits ($CLK_{15}$ to $CLK_7$), and can be expressed by $D=A_{18-10} \oplus CLK_{15-7}$. The Perm5 operation 14 has a 5-bit output, i.e., parameter R ($R_0$ to $R_4$) (see FIG. 2).

The second ADD operation 15 has four inputs (i.e., E, F, Y2, and the parameter R from the Perm5 operation 14), and has a 7-bit output. The second ADD operation 15 is followed by mod 79 operation. The input E is a 7-bit binary number directly derived from the MAC address bits ($A_{13, 11, 9, 7, 5, 3, 1}$), and is expressed by $E=A_{13,11,9,7,5,3,1}$. The input F is a 7-bit binary number obtained by multiplying the clock bits ($CLK_{27}$ to $CLK_7$) by 16 followed by mod 79 operation, and is expressed by $E=[16 \times CLK_{27-7}]$ mod 79. The input Y2 is a 6-bit binary number obtained by multiplying the clock bit ($CLK_1$) by 32, and is expressed by $Y2=32 \times CLK_1$.

Figure 3:
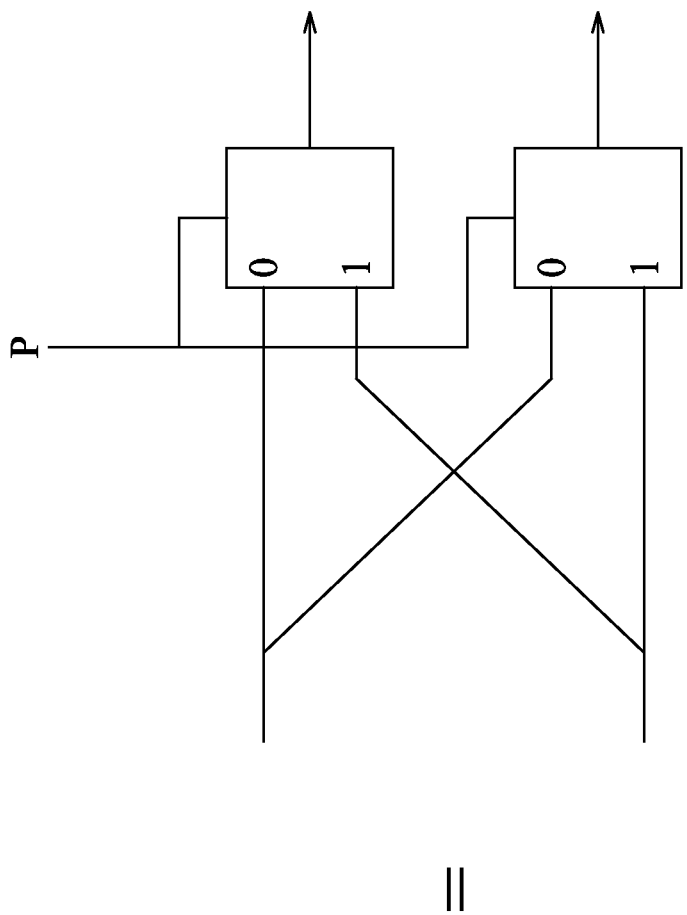
FIG. 3 illustrates a cell of the permutation operation of FIG. 2.

Referring to FIG. 2, the Perm5 operation 14 is to provide, based on the parameter P ($P_{13}$ to $P_0$), a swapped version of the parameter Z ($Z_0$ to $Z_4$) as the output to be inputted to the second ADD operation 15. The internal structure of the Perm5 operation 14 consists of 14 cascaded cells. Each cell is to swap two bits of the parameter Z, and is constructed by using 2 multiplexer devices (see FIG. 3).

In the eMTC-U system, due to constraint on the regulations in different regions as mentioned above, the data channel hops from one channel to another, and furthermore, data transmission on a specific channel relies on the success in carrier sensing procedure over the specific channel. In order to provide the UE(s), the PCell and the SCell(s) the information related to a channel to which the system hops, various embodiments for generating a frequency hopping sequence are provided. In one embodiment, in order to univocally generate a frequency hopping sequence, the frequency hopping sequence may be a function of a system frame number (SFN), a physical cell identifier (PCI), and an eFrame that is the least significant 3 bits of a hyperframe index, reducing likelihood of collisions during multi-carrier operation or concurrent use of transmission resources.

Figure 4:
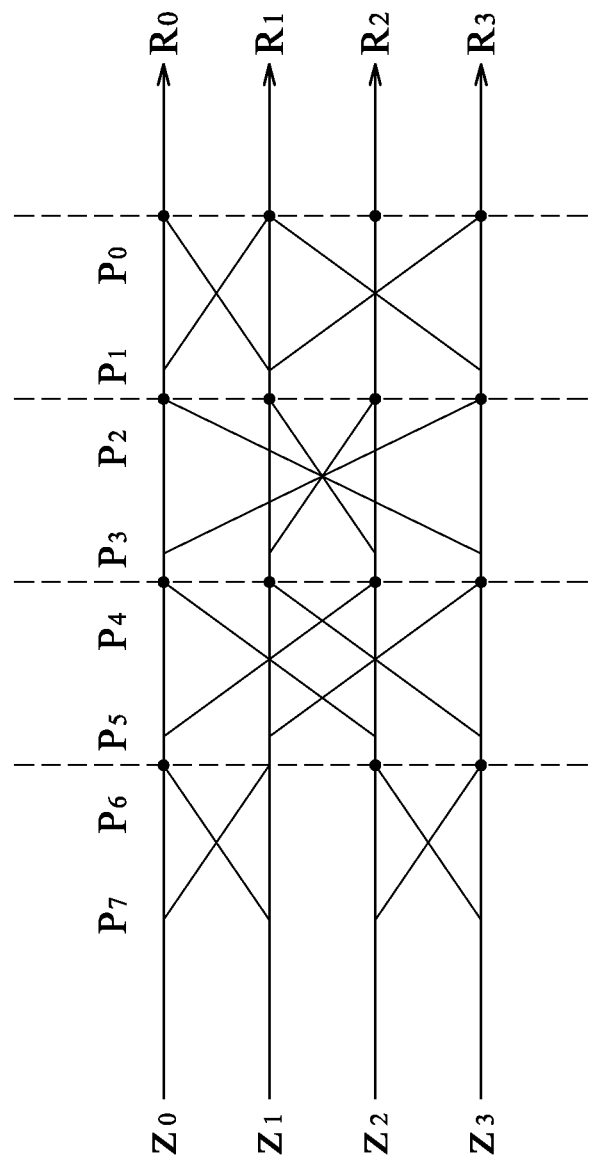
FIG. 4 illustrates an internal structure of a 4-bit permutation operation.

In one embodiment, the frequency hopping sequence for the unlicensed IoT system (i.e., the eMTC-U system) can be generated in a manner similar to the Bluetooth® frequency hopping selection kernel 10 as shown in FIG. 1. In this embodiment, the pseudorandom frequency hopping sequence is a function of the PCI and/or the SFN or a hyper frame number (HFN). The frequency hopping sequence is generated by a non-linear function (e.g., the Bluetooth® frequency hopping selection kernel 10 of FIG. 1) that includes a permutation operation to swap input bits so as to provide relatively more randomicity of the frequency hopping sequence. In some embodiments, the Perm5 operation 14 as shown in FIG. 2 can be used as the permutation operation in generation of the frequency hopping sequence for the unlicensed IoT system. In one embodiment, a new permutation operation can be defined. For example, FIG. 4 illustrates a 4-bit permutation operation (Perm4) that can be used in the generation of the frequency hopping sequence for the unlicensed IoT system. As shown in FIG. 4, the Perm4 operation is to swap four input bits ($Z_0$ to $Z_3$) with eight control bits ($P_7$ to $P_0$) to generate an output sequence with four bits ($R_0$ to $R_3$). The Perm4 operation has 4 stages each including 2 cells. Each cell of the Perm4 operation is to permute two of the input bits ($Z_0$ to $Z_3$) by swapping the two of the input bits ($Z_0$ to $Z_3$) or directly outputting the two of the input bits ($Z_0$ to $Z_3$).

In one embodiment, the parameter P (the control of the permutation operation) is a function of the PCI and/or the SFN or the HFN. In one embodiment, the parameter P is generated using a pseudorandom number generator with the PCI as a seed. The pseudorandom number generator includes, for example, Mersenne Twister, a lagged Fibonacci generator, a multiple recursive generator and other suitable pseudorandom number generators.

In some embodiments, in order to further randomize the generation of the frequency hopping sequence, a logical combination of two or more sequences can be conducted to generate a frequency hopping sequence.

Figure 5:
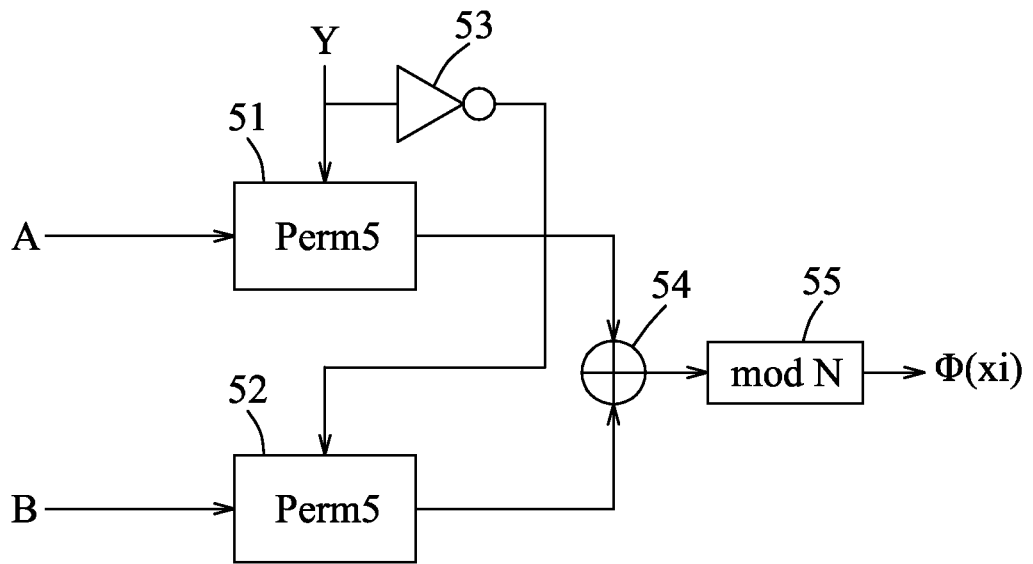
FIG. 5 illustrates an example of a frequency hopping sequence generator to generate a frequency hopping sequence through a logical combination of two sequences.

For example, a whitelist Φ={1, 2, . . . , 15} containing channel numbers (indices of frequency channels) is indicated in an essential system information block (SIB) that is transmitted on an anchor channel, and a frequency hopping sequence Φ(xi) can be generated by a frequency hopping sequence generator as shown in FIG. 5. The frequency hopping sequence generator of FIG. 5 includes a first Perm5 operation 51 and a second Perm5 operation 52. The input and control of the first Perm5 operation 51 are parameter A and parameter Y, respectively. The input of the second Perm5 operation 52 is parameter B, and the control of the second Perm5 operation 52 is logical complement of the parameter Y (i.e., output of a logical inverter (NOT operation) 53 with the parameter Y as input). The two sequences generated respectively by the first Perm5 operation 51 and the second Perm5 operation 52 are combined by an XOR operation 54 followed by mod N operation 55, where N is the total number of frequency channels and is either 16 or 32. The output of the mod N operation 55 is the frequency hopping sequence Φ(xi). In one embodiment, the parameter A can be obtained from the most significant bits of the SFN that is 10-bit long, and the parameter B can be obtained from the least significant bits of the SFN, or vice versa. In one embodiment, the parameter A can be obtained from odd bits of the SFN, and the parameter B can be obtained from even bits of the SFN, or vice versa. In one embodiment, the parameter Y is a function of the PCI and the SFN or the HFN. For example, Y=PCI×32+SFN' where SFN'=floor [(SFN+eFrame×1024)/8], and floor denotes a flooring function. The parameter Y=PCI×32+SFN' can result in 14 control bits for the first Perm5 operation 51 and the second Perm5 operation 52.

Figure 6:
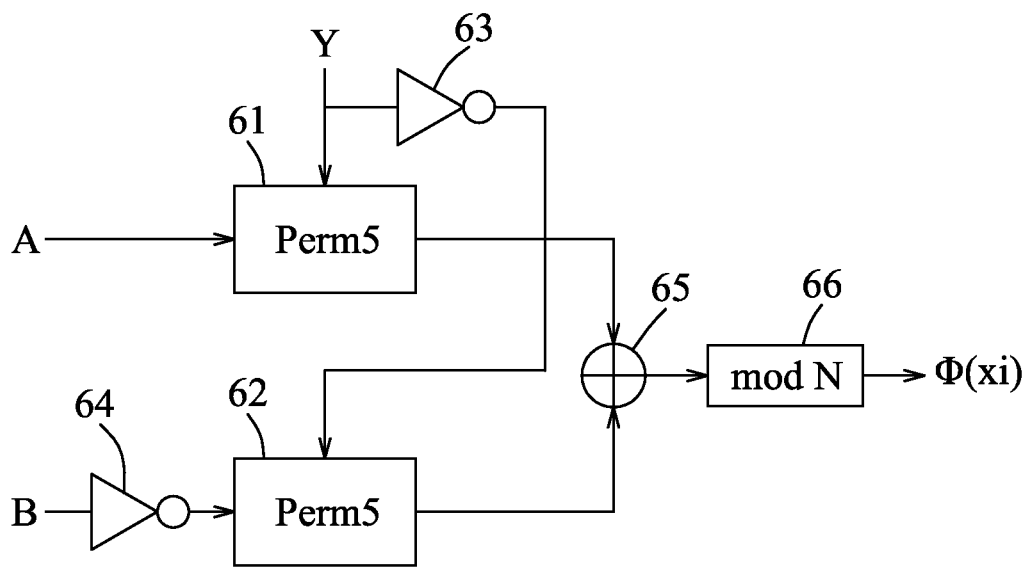
FIG. 6 illustrates another example of a frequency hopping sequence generator to generate a frequency hopping sequence through a logical combination of two sequences.

FIG. 6 illustrates another example of a frequency hopping sequence generator to generate a frequency hopping sequence by conducting a logical combination of two sequences. The frequency hopping sequence generator of this example is similar to the example of FIG. 5. In this example, the frequency hopping sequence generator includes a first Perm5 operation 61, a second Perm5 operation 62, a first logical inverter 63, a second logical inverter 64, an XOR operation 65 and a mod N operation 66. Similar to the first Perm5 operation 51 of FIG. 5, the input and control of the first Perm5 operation 61 are the parameter A and the parameter Y, respectively. The input of the second Perm5 operation 62 is logical negation of the parameter B (i.e., output of the second logical inverter 64 with the parameter B as input), and the control of the second Perm5 operation 62 is the output of the first logical inverter 63 (i.e., the logical negation of the parameter Y). The two sequences generated respectively by the first Perm5 operation 61 and the second Perm5 operation 62 are combined by the XOR operation 65 followed by the mod N operation 66. In this example, the frequency hopping sequence Φ(xi) can be generated with xi expressed by xi={Perm5(SFN'$_{10,8,6,4,2}$, Y) XOR Perm5(NOT SFN'$_{9,7,5,3,1}$, NOT Y)} mod|Φ|+1, where |Φ| denotes dimension of the frequency hopping sequence, and the notation of $X_{N1,N2,N3,N4,N5}$ denotes the N1$^{th}$, N2$^{th}$, N3$^{th}$, N4$^{th}$ and N5$^{th}$ least significant bits of parameter X in binary form. For example, SFN'$_{10,8,6,4,2}$ denotes the tenth, eighth, sixth, fourth and second least significant bits of the SFN'.

Figure 7:
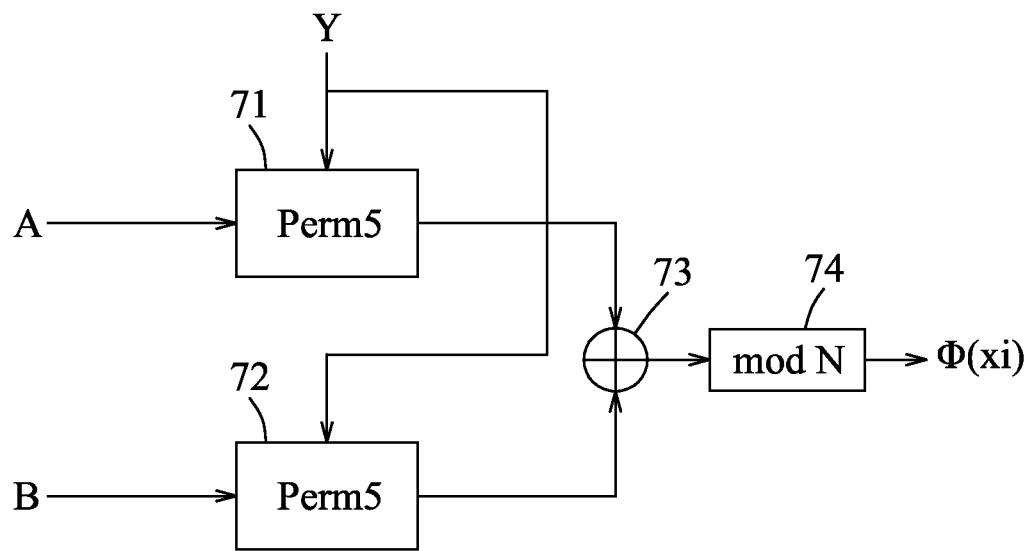
FIG. 7 illustrates yet another example of a frequency hopping sequence generator to generate a frequency hopping sequence through a logical combination of two sequences.

FIG. 7 illustrates yet another example of a frequency hopping sequence generator to generate a frequency hopping sequence by conducting a logical combination of two sequences. In this example, the frequency hopping sequence generator includes a first Perm5 operation 71, a second Perm5 operation 72, an XOR operation 73 and a mod N operation 74. The input of the first Perm5 operation 71 and the input of the second Perm5 operation 72 are the parameter A and the parameter B, respectively. The control of each of the first Perm5 operation 71 and the second Perm5 operation 72 is the parameter Y. In this example, the parameter Y is generated based on a pseudorandom number generator using the PCI as a seed. For example, the parameter Y is obtained by generating a 14-bit sequence through the Mersenne Twister, the lagged Fibonacci generator, or other suitable pseudorandom number generators. In this example, the parameter Y is expressed by Y=1−[Ψ], where Ψ denotes initial 14 values generated by the pseudorandom number generator with the seed equal to the PCI, and [•] indicates an operation of rounding Ψ. The frequency hopping sequence Φ(xi) can be generated with xi expressed by xi={Perm5 (SFN'$_{10,8,6,4,2}$, Y) XOR Perm5(SFN'$_{9,7,5,3,1}$, Y)} mod|Φ|+1.

In order to be compliant with the regulations given by FCC and ETST, the system hops to a data channel that is at most 7 times the length of the anchor channel within a total data channel of 80 ms according to the frequency hopping sequence. Moreover, a frequency hopping sequence can be generated such that, after m×N elements, each data channel repeats once within a group of N elements (i.e., the number N of frequency channels). The number m×N determines a total cycle length of the frequency hopping sequence or periodicity of the frequency hopping sequence, and the number m is a total number of sequences each composed by N elements.

Figure 8:
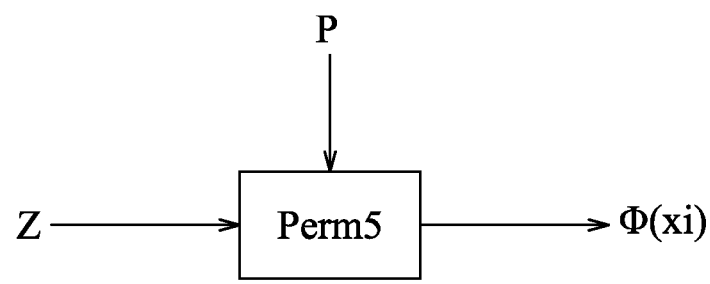
FIG. 8 illustrates an example of a frequency hopping sequence generator to generate a frequency hopping sequence with one permutation operation.

Referring to FIG. 8, in order to achieve such a frequency hopping sequence, the Perm5 operation is used with an input parameter z and a control parameter P. In some embodiments, the input parameter z depends on the PCI and some bits of the SFN', and the control parameter P depends on the PCI and also on some bits of the SFN'. In one embodiment, both the input parameter z and the control parameter P depend on the total number N of frequency channels. In one embodiment, dependency of the input parameter z is limited to the least significant 5 bits of the SFN', and the control parameter P depends instead on the most significant 5 or 6 bits of the SFN'. The frequency hopping sequence Φ(xi) can be generated with xi=Perm5(z, P)+1, where the input parameter z is a combination of the PCI and the SFN, and the control parameter P is a function of the PCI, the SFN and the total number N of frequency channels.

In one embodiment, the input parameter z can be expressed by z={SFN'$_{1,2,3,4,5}$+PCI$_{1,2,3,4,5}$+PCI$_{5,6,7,8,9}$} mod N, and the control parameter P can be expressed by P=P' if N=32 or by P=P' with P$_{11,9,8,5,4}$=[0,0,0,0,0] if N=16 where P'={PCI+SFN'$_{6,7,8,9,10}$+512×SFN'$_{6,7,8,9,10}$+N×(N−16)/16+ SFN'$_5$×(32−N)×32} mod $2^{14}$. It should be noted that the bits P$_{11,9,8,5,4}$=[0,0,0,0,0] of the control parameter P are used to mask and disable scrambling of the most significant bit of the input parameter within the Perm5 operation. Accordingly, the frequency hopping sequence Φ(xi) can be generated with xi expressed by xi=Perm5({SFN'$_{1,2,3,4,5}$+ PCI$_{1,2,3,4,5}$+PCI$_{5,6,7,8,9}$} mod N, P)+1.

In one embodiment, the input parameter z can be expressed by z={SFN'$_{1,2,3,4,5}$+PCI$_{1,2,3,4,5}$ XOR SFN'$_{6,7,8,9,10}$} mod N, and the control parameter P is the same as above.

In one embodiment, the input parameter z can be expressed by either z={SFN'$_{1,2,3,4,5}$+PCI$_{1,2,3,4,5}$ XOR SFN'$_{6,7,8,9,10}$} mod N or z={SFN'$_{1,2,3,4,5}$+PCI$_{1,2,3,4,5}$+ PCI$_{5,6,7,8,9}$} mod N, and the control parameter P can be expressed by P=P' if N=32 or by P=P' with P$_{11,9,8,5,4}$=[0,0, 0,0,0] if N=16 where P'=PCI+512×SFN'$_{6,7,8,9,10}$.

In one embodiment, similar to the control parameter P, the input parameter z can be generated through a linear or non-linear combination of the PCI, the SFN and the number N.

In one embodiment, in order to further randomize the frequency hopping sequence, the input parameter z can be expressed by z={SFN'$_{y1,y2,y3,y4,y5}$+PCI$_{1,2,3,4,5}$+PCI$_{5,6,7,8,9}$} mod N, where parameters y1, y2, y3, y4 and y5 are elements in a permutation of {1, 2, 3, 4, 5}. In one embodiment, the parameter y5 is always set to 5 (i.e., y5=5). In one embodiment, the parameters y1, y2, y3, y4 and y5 are set to two different permutations of {1, 2, 3, 4, 5} when the total number N of frequency channels is 16 (N=16) and when the total number N of frequency channels is 32 (N=32), respectively. For example, the parameters y1, y2, y3, y4 and y5 are set to {3, 1, 4, 2, 5} when N=16, and are set to {3, 1, 4, 5, 2} when N=32. In one embodiment, values respectively of the parameters y1, y2, y3, y4 and y5 can vary based upon at least two bits of the SFN (e.g., SFN$_{5,6}$ or SFN$_{6,7}$). For example, the parameters y1, y2, y3, y4 and y5 can be determined according to Table 1 based on two bits of the SFN. In one embodiment, the values of the parameters y1, y2, y3, y4 and y5 are determined by a circular shift of a predetermined sequence according to at least two bits of the SFN. In one embodiment, the circular shift can be applied to the bits of the input parameter z. In another embodiment, the values of the parameters y1, y2, y3, y4 and y5 are determined by a circular shift of a predetermined sequence according to one bit of the SFN.

TABLE 1

| 2 Bits of SFN | y1, y2, y3, y4, y5 |
| --- | --- |
| 00 | {3, 1, 4, 2, 5} |
| 01 | {1, 3, 4, 2, 5} |
| 10 | {3, 4, 1, 2, 5} |
| 11 | {3, 1, 2, 4, 5} |

In some embodiments, the whitelist Φ with dimension N is composed of the indices respectively of the frequency channels (channel numbers), and all possible permutations of the channel numbers are generated first. For each PCI, a different frequency hopping sequence is formed by selecting, from the all possible permutations, a predetermined number of unique sequences. For example, 64 sequences are selected from the possible permutations when the total number N of frequency channels is 16, and 32 sequences are selected from the possible permutations when the total number N of frequency channels is 32 where each individual unique sequence is longer. Then, the frequency hopping sequence is generated based on the unique sequences. For example, the frequency hopping sequence is generated by stringing up the unique sequences. The predetermined number of the unique sequences is selected so that, for each PCI, the frequency hopping sequence is different and there is a minimum probability of collision.

In one embodiment, a matrix ψ with dimension (N×N!) is generated to indicate the possible permutations, and each of the unique sequences is selected by selecting a specific element of the matrix ψ. For example, the frequency hopping sequence is expressed by ψ{[PCI+floor(SFN'/|Φ|)] mod N+1, SFN' mod|Φ|+1}.

In one embodiment, the frequency hopping sequence is generated such that two data channels for two consecutive hops are closer to each other. For example, the whitelist Φ has dimension |Φ|=N=4, and the matrix ψ indicating all possible permutations of the indices of the frequency channels is ψ=perm(Φ)=[4,3,2,1; 4,3,1,2; 4,2,3,1; 4,2,1,3; 4,1,3, 2; 4,1,2,3; 3,4,2,1; 3,4,1,2; 3,2,4,1; 3,2,1,4; 3, 1,4,2; 3,1,2,4; 2,4,3,1; 2,4,1,3; 2,3,4,1; 2,3,1,4; 2,1,4,3; 2,1,3,4; 1,4,3,2; 1,4,2,3; 1,3,4,2; 1,3,2,4; 1,2,4,3; 1,2,3,4]. Selection of the unique sequences is by removing all the rows containing two adjacent elements that are spread apart by more than a predetermined value M (i.e., |a$_i$−a$_{i+1}$|>=M) where a$_i$ and a$_{i+1}$ represent two adjacent elements in one row. In some embodiments, each row containing the last element that is too much spread apart from the first element of a next row is also removed. In a case where M=2, the unique sequences are selected as ψ={perm(Φ)\Y$_z$⊂perm(Φ)|z: |a$_i$−a$_{i+1}$|>=M}.

In a case where M=1, the unique sequences are selected as $\psi$=[4,3,2,1; 1,2,3,4]. The frequency hopping sequence is then obtained by selecting a specific element of the matrix $\psi$ as a function of the PCI and the SFN or the HFN. For example, the frequency hopping sequence can be expressed by $\psi\{[PCI+floor(SFN'/|\Phi|)] \bmod |\psi|+1, SFN' \bmod |\psi|+1\}$.

Figure 9:
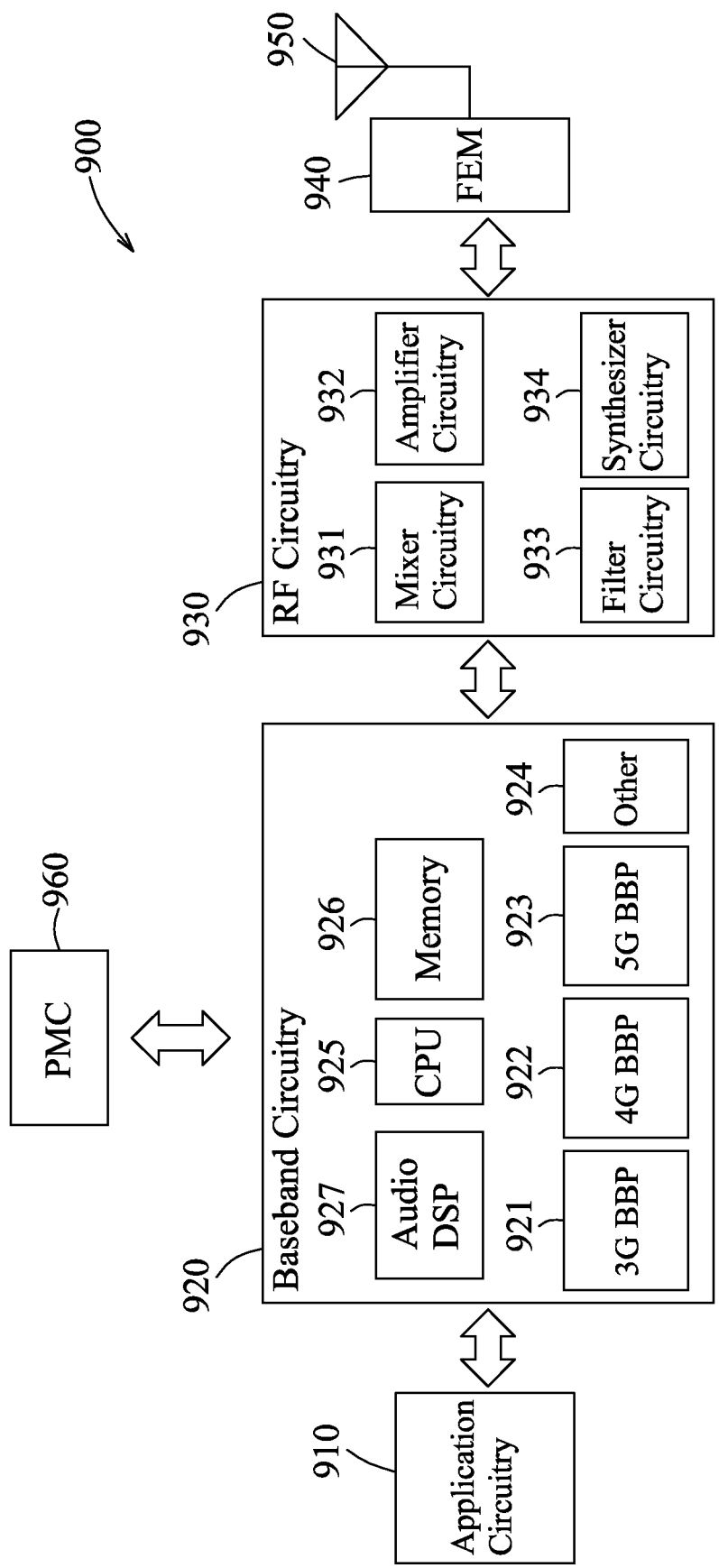
FIG. 9 is a schematic block diagram illustrating an apparatus for generating a frequency hopping sequence in an unlicensed Internet-of-Things system according to some embodiments of this disclosure.

FIG. 9 illustrates an example of an apparatus 900 operable for ultra-reliable and low-latency communication according to some embodiments of this disclosure. For example, the apparatus 900 may be included in a user equipment (UE) or a radio access network (RAN) node. In this embodiment, the apparatus 900 includes application circuitry 910, baseband circuitry 920, radio frequency (RF) circuitry 930, front-end module (FEM) circuitry 940, one or more antennas 950 (only one is depicted) and power management circuitry (PMC) 960. In some embodiments, the apparatus 900 may include fewer components. For example, a RAN node may not include the application circuitry 910, and instead include a processor/controller to process Internet-Protocol (IP) data received from an evolved packet core (EPC) network. In other embodiments, the apparatus 900 may include additional components, for example, a memory/storage device, a display, a camera, a sensor or an input/output (I/O) interface. In some embodiments, the above-mentioned components may be included in more than one device. For example, in order to implement a Cloud-RAN architecture, the above-mentioned circuitries may be separated and included in two or more devices in the Cloud-RAN architecture.

The application circuitry 910 may include one or more application processors. For example, the application circuitry 910 may include, but is not limited to, one or more single-core or multi-core processors. The processors may include any combination of general-purpose processors and dedicated processors (e.g., graphics processors, application processors, etc.). The processors may be coupled to or include a memory/storage module, and may be configured to execute instructions stored in the memory/storage module to enable various applications or operating systems to run on the apparatus 900. In some embodiments, the processors of the application circuitry 910 may process IP data packets received from an EPC network.

In some embodiments, the baseband circuitry 920 may provide for communication compatible with one or more radio technologies. For example, in some embodiments, the baseband circuitry 920 may support communication with an evolved universal terrestrial radio access network (EU-TRAN) or other wireless metropolitan area networks (WMAN), a wireless local area network (WLAN), or a wireless personal area network (WPAN). In some embodiments where the baseband circuitry 920 is configured to support radio communication using more than one wireless protocol, the baseband circuitry 920 may be referred to as a multi-mode baseband circuitry.

The baseband circuitry 920 may include, but is not limited to, one or more single-core or multi-core processors. The baseband circuitry 920 may include one or more baseband processors or control logic to process baseband signals received from the RF circuitry 930, and to generate baseband signals to be transmitted to the RF circuitry 930. The baseband circuitry 920 may interface and communicate with the application circuitry 910 for generation and processing of the baseband signals and for controlling operations of the RF circuitry 930.

In some embodiments, the baseband circuitry 920 may include a third generation (3G) baseband processor (3G BBP) 921, a fourth generation (4G) baseband processor (4G BBP) 922, a fifth generation (5G) baseband processor (5G BBP) 923 and other baseband processor(s) 924 for other existing generations, generations in development or to be developed in the future (e.g., second generation (2G), sixth generation (6G), etc.). The baseband processors 921-924 of the baseband circuitry 920 are configured to handle various radio control functions that enable communication with one or more radio networks via the RF circuitry 930. In other embodiments, the baseband circuitry 920 may further include a central processing unit (CPU) 925 and a memory 926, and some or all functionality (e.g., the radio control functions) of the baseband processors 921-924 may be implemented as software modules that are stored in the memory 926 and executed by the CPU 925 to carry out the functionality. The radio control functions of the baseband processors 921-924 may include, but are not limited to, signal modulation/demodulation, encoding/decoding, radio frequency shifting, etc. In some embodiments, the signal modulation/demodulation includes Fast-Fourier Transform (FFT), pre-coding or constellation mapping/de-mapping. In some embodiments, the encoding/decoding includes convolution, tail-biting convolution, turbo, Viterbi, or Low Density Parity Check (LDPC) encoding/decoding. Embodiments of the signal modulation/demodulation and the encoding/decoding are not limited to these examples and may include other suitable operations in other embodiments. In some embodiments, the baseband circuitry 920 may further include an audio digital signal processor (DSP) 927 for compression/decompression and echo cancellation.

In some embodiments, the components of the baseband circuitry 920 may be integrated as a single chip or a single chipset, or may be disposed on a single circuit board. In some embodiments, some or all of the constituent components of the baseband circuitry 920 and the application circuitry 910 may be integrated as, for example, a system on chip (SoC).

The RF circuitry 930 is configured to enable communication with wireless networks using modulated electromagnetic radiation through a non-solid medium. In various embodiments, the RF circuitry 930 may include switches, filters, amplifiers, etc., to facilitate communication with the wireless network. The RF circuitry 930 may include a receive signal path that includes circuitry to down-convert RF signals received from the FEM circuitry 940 and to provide the baseband signals to the baseband circuitry 920. The RF circuitry 930 may further include a transmit signal path that includes circuitry to up-convert the baseband signals provided by the baseband circuitry 920 and to provide RF output signals to the FEM circuitry 940 for transmission.

In some embodiments, the receive signal path of the RF circuitry 930 may include mixer circuitry 931, amplifier circuitry 932 and filter circuitry 933. In some embodiments, the transmit signal path of the RF circuitry 930 may include filter circuitry 933 and mixer circuitry 931. The RF circuitry 930 may also include synthesizer circuitry 934 for synthesizing a frequency for use by the mixer circuitry 931 of the receive signal path and/or the transmit signal path.

For the receive signal path, in some embodiments, the mixer circuitry 931 may be configured to down-convert RF signals received from the FEM circuitry 940 based on the synthesized frequency provided by synthesizer circuitry 934. The amplifier circuitry 932 may be configured to amplify the down-converted signals. The filter circuitry 933 may be a low-pass filter (LPF) or a band-pass filter (BPF) configured to remove unwanted signals from the down-converted signals to generate output baseband signals. The output baseband signals may be provided to the baseband circuitry 920 for further processing. In some embodiments, the output baseband signals may be zero-frequency baseband signals, although this is not a requirement. In some embodiments, the mixer circuitry 931 of the receive signal path may include passive mixers, although the scope of the embodiments is not limited in this respect.

As for the transmit signal path, in some embodiments, the mixer circuitry 931 may be configured to up-convert input baseband signals based on the synthesized frequency provided by the synthesizer circuitry 934 to generate the RF output signals for the FEM circuitry 940. The input baseband signals may be provided by the baseband circuitry 920, and may be filtered by the filter circuitry 933.

In some embodiments, the mixer circuitry 931 of the receive signal path and the mixer circuitry 931 of the transmit signal path may include two or more mixers and may be arranged for quadrature down-conversion in the receive signal path and for quadrature up-conversion in the transmit signal path. In some embodiments, the mixer circuitry 931 of the receive signal path and the mixer circuitry 931 of the transmit signal path may include two or more mixers and may be arranged for image rejection (e.g., Hartley image rejection). In some embodiments, the mixer circuitry 931 of the receive signal path and the mixer circuitry 931 of the transmit signal path may be arranged for direct down-conversion and direct up-conversion, respectively. In some embodiments, the mixer circuitry 931 of the receive signal path and the mixer circuitry 931 of the transmit signal path may be configured for super-heterodyne operation.

In some embodiments, the output baseband signals and the input baseband signals may be analog baseband signals, although the scope of the embodiments is not limited in this respect. In alternative embodiments, the output baseband signals and the input baseband signals may be digital baseband signals. In such alternative embodiments, the RF circuitry 930 may further include analog-to-digital converter (ADC) circuitry and digital-to-analog converter (DAC) circuitry, and the baseband circuitry 920 may include a digital baseband interface to communicate with the RF circuitry 930.

In some dual-mode embodiments, a separate radio IC circuitry may be provided for processing signals for each spectrum, although the scope of the embodiments is not limited in this respect.

In some embodiments, the synthesizer circuitry 934 may be a fractional-N synthesizer or a fractional N/N+1 synthesizer, although the scope of the embodiments is not limited in this respect as other types of frequency synthesizers may be suitable. For example, the synthesizer circuitry 934 may be a delta-sigma synthesizer, a frequency multiplier, or a synthesizer comprising a phase-locked loop with a frequency divider in other embodiments.

The synthesizer circuitry 934 may be configured to synthesize an output frequency for use by the mixer circuitry 931 of the RF circuitry 930 based on a frequency input and a divider control input. In some embodiments, the frequency input may be provided by a voltage controlled oscillator (VCO), although that is not a requirement. In some embodiments, the divider control input may be provided by either the baseband circuitry 920 or the application circuitry 910 depending on the desired output frequency. In some embodiments, the divider control input (e.g., N) may be determined according to a look-up table based on a channel indicated by the application circuitry 910.

The synthesizer circuitry 934 of the RF circuitry 930 may include a divider, a delay-locked loop (DLL), a multiplexer and a phase accumulator. In some embodiments, the divider may be a dual modulus divider (DMD), and the phase accumulator may be a digital phase accumulator (DPA). In some embodiments, the DMD may be configured to divide an input signal by either N or N+1 (e.g., based on a carry out) to provide a fractional division ratio. In some embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is a number of the delay elements in the delay line. In this way, the DLL provides negative feedback to help ensure that the total delay through the delay line is one VCO cycle.

In some embodiments, the synthesizer circuitry 934 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 930 may include an IQ/polar converter.

The FEM circuitry 940 may include a receive signal path that includes circuitry configured to operate on RF signals received from the one or more antennas 950, to amplify the received RF signals and to provide amplified versions of the received RF signals to the RF circuitry 930 for further processing. The FEM circuitry 940 may further include a transmit signal path that includes circuitry configured to amplify signals provided by the RF circuitry 930 for transmission by one or more of the one or more antennas 950. In various embodiments, the amplification through the transmit or receive signal path may be done solely in the RF circuitry 930, solely in the FEM circuitry 940, or in both the RF circuitry 930 and the FEM circuitry 940.

In some embodiments, the FEM circuitry 940 may include a TX/RX switch to switch between transmit mode operation and receive mode operation. The receive signal path of the FEM circuitry 940 may include a low-noise amplifier (LNA) to amplify the received RF signals and to provide the amplified versions of the received RF signals as an output (e.g., to the RF circuitry 930). The transmit signal path of the FEM circuitry 940 may include a power amplifier (PA) to amplify input RF signals (e.g., provided by the RF circuitry 930), and one or more filters to generate RF signals for subsequent transmission (e.g., by one or more of the one or more antennas 950).

In some embodiments, the PMC 960 is configured to manage power provided to the baseband circuitry 920. In particular, the PMC 960 may control power-source selection, voltage scaling, battery charging, or DC-to-DC conversion. The PMC 960 may often be included in the apparatus 900 when the apparatus 900 is capable of being powered by a battery. For example, when the apparatus 900 is included in a UE, it generally includes the PMC 960. The PMC 960 may increase the power conversion efficiency while providing desirable implementation size and heat dissipation characteristics.

While FIG. 9 shows the PMC 960 being coupled only with the baseband circuitry 920, in other embodiments, the PMC 960 may be additionally or alternatively coupled with, and perform similar power management operations for, other components such as, but not limited to, the application circuitry 910, the RF circuitry 930 or the FEM 940.

In some embodiments, the PMC 960 may control, or otherwise be part of, various power saving mechanisms of the apparatus 900. For example, if the apparatus 900 is in an RRC_Connected state, where it is still connected to the RAN node as it expects to receive traffic shortly, then it may enter a state known as Discontinuous Reception Mode (DRX) after a period of inactivity. During this state, the apparatus 900 may power down for brief intervals of time and thus save power.

If there is no data traffic activity for an extended period of time, then the apparatus 900 may enter an RRC_Idle state, where it disconnects from network and does not perform operations such as channel quality feedback, handover, etc. The apparatus 900 goes into a very low power state and it performs paging where it periodically wakes up to listen to the network and then powers down again. The apparatus 900 may not receive data in this state. In order to receive data, the apparatus 900 transitions back to the RRC_Connected state.

An additional power saving mode may allow a device or apparatus to be unavailable to the network for periods longer than a paging interval (ranging from seconds to a few hours). During this time, the device or apparatus is totally unreachable to the network and may power down completely. Any data sent during this time incurs a large delay and it is assumed the delay is acceptable.

Processors of the application circuitry 910 and processors of the baseband circuitry 920 may be used to execute elements of one or more instances of a protocol stack. For example, processors of the baseband circuitry 920, alone or in combination, may be used to execute Layer 3, Layer 2, or Layer 1 functionality, while processors of the application circuitry 910 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 10:
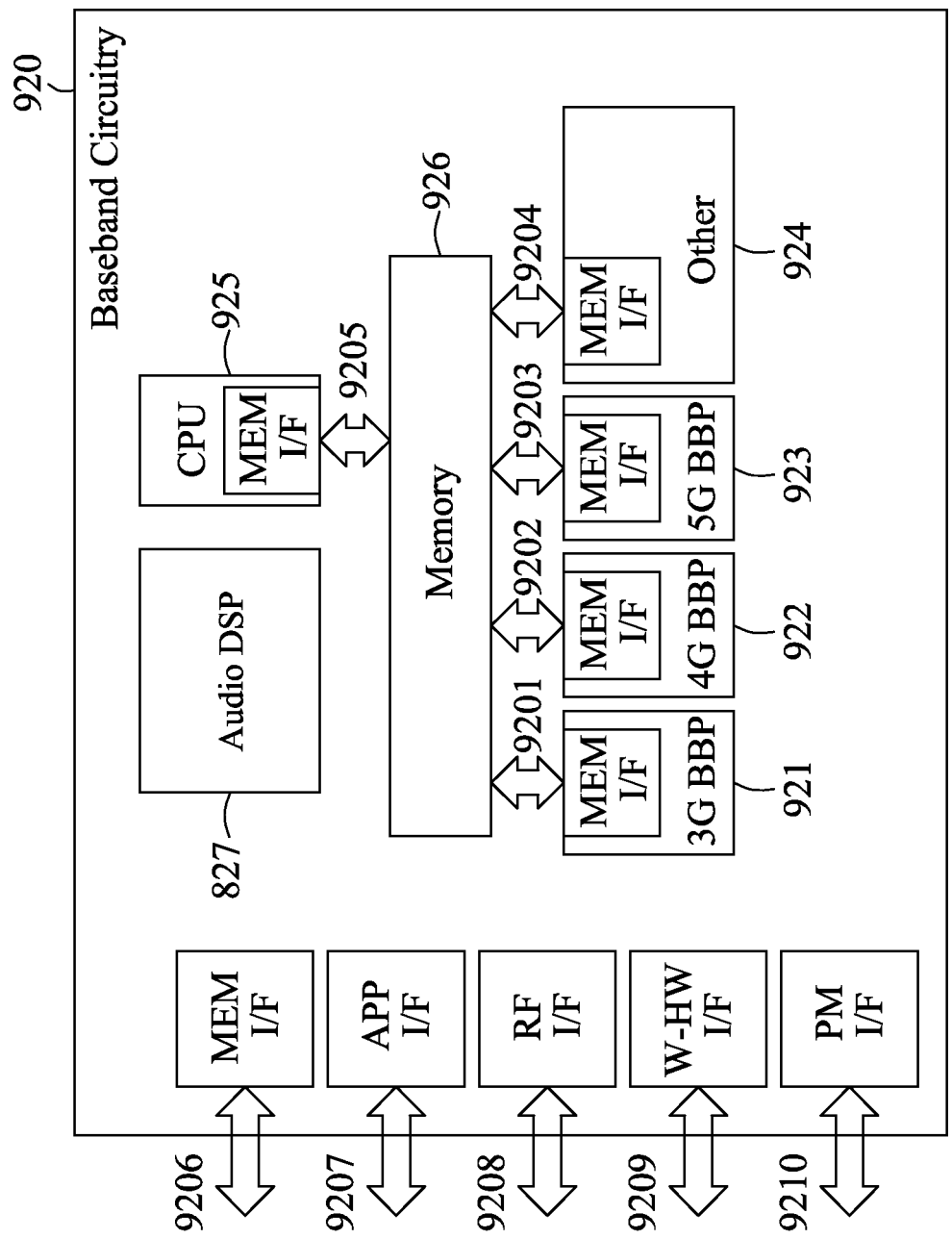
FIG. 10 illustrates example interfaces of baseband circuitry according to some embodiments of this disclosure.

FIG. 10 illustrates example interfaces of baseband circuitry in accordance with some embodiments. As discussed above, the baseband circuitry 920 of FIG. 9 includes various processors (i.e., the baseband processors 921-924 and the CPU 925), and the memory 926 utilized by the processors. Each of the processors 921-925 may include an internal memory interface (MEM I/F) 9201-9205 communicatively coupled to the memory 926 so as to send/receive data to/from the memory 926.

The baseband circuitry 920 may further include one or more interfaces to communicatively couple to other circuitries/devices. The one or more interfaces include, for example, a memory interface (MEM I/F) 9206 (e.g., an interface to send/receive data to/from memory external to the baseband circuitry 920), an application circuitry interface (APP I/F) 9207 (e.g., an interface to send/receive data to/from the application circuitry 910 of FIG. 9), an RF circuitry interface (RF I/F) 9208 (e.g., an interface to send/receive data to/from the RF circuitry 930 of FIG. 9), a wireless hardware connectivity interface (W-HW I/F) 9209 (e.g., an interface to send/receive data to/from Near Field Communication (NFC) components, Bluetooth® components (e.g., Bluetooth® Low Energy), Wi-Fi® components, and/or other communication components), and a power management interface (PM I/F) 9210 (e.g., an interface to send/receive power or control signals to/from the PMC 960 of FIG. 9).

Figure 11:
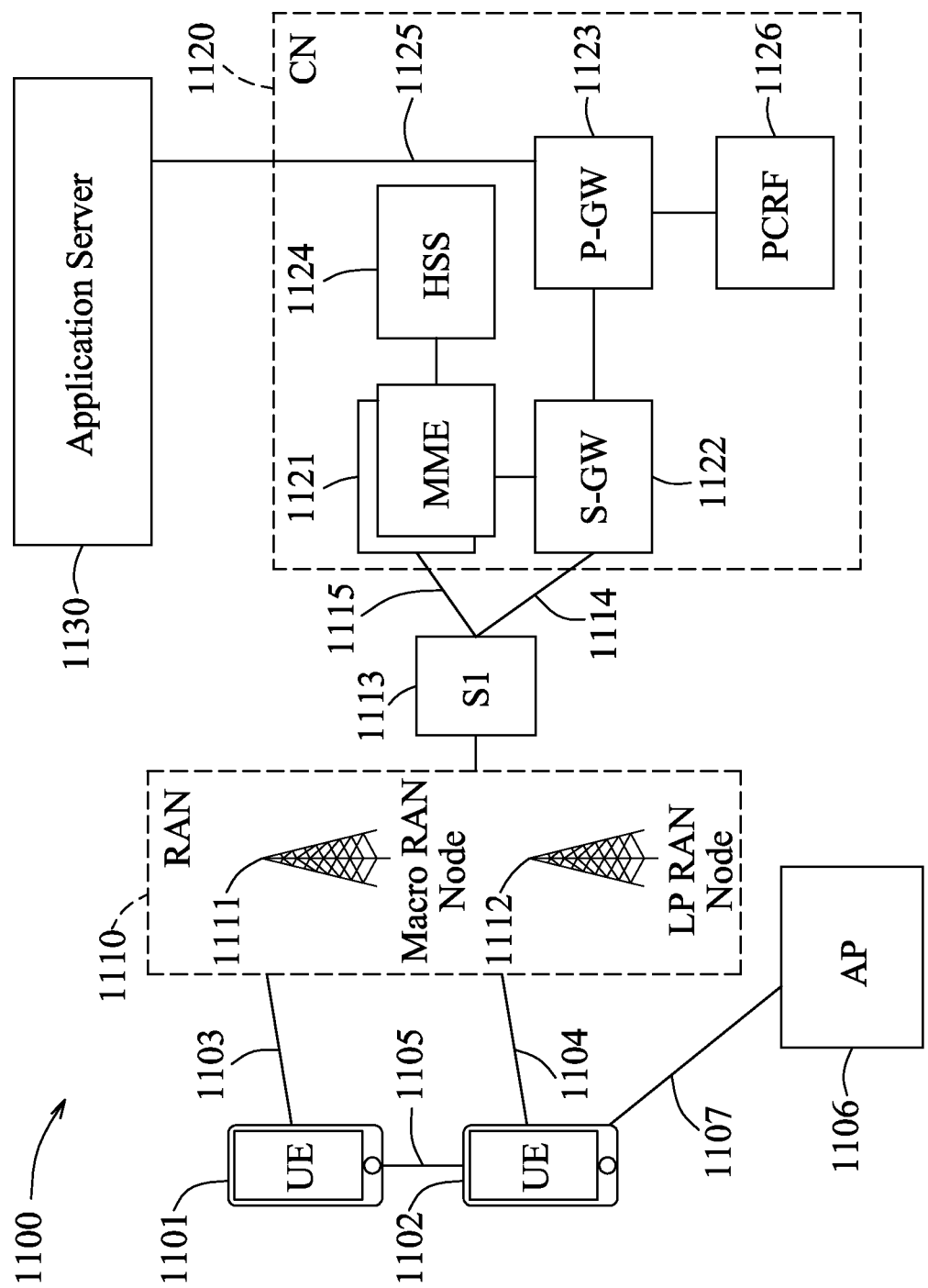
FIG. 11 illustrates an architecture of a system of a network according to some embodiments of this disclosure.

FIG. 11 illustrates an architecture of a system 1100 of a network in accordance with some embodiments of this disclosure. The system 1100 is shown to include a user equipment (UE) 1101 and a UE 1102. The UEs 1101 and 1102 are illustrated as smartphones (e.g., handheld touchscreen mobile computing devices connectable to one or more cellular networks), but may also include any mobile or non-mobile computing device, such as Personal Data Assistants (PDAs), pagers, laptop computers, desktop computers, wireless handsets, or any computing device including a wireless communications interface.

In some embodiments, at least one of the UEs 1101 and 1102 may be an Internet-of-Things (IoT) UE, which can include a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UE may execute background applications (e.g., keep-alive messages, status updates, etc.) to facilitate the connections of the IoT network.

The UEs 1101 and 1102 may be configured to connect, e.g., communicatively couple, with a radio access network (RAN) 1110. The RAN 1110 may be, for example, an Evolved Universal Mobile Telecommunications System (UMTS) Terrestrial Radio Access Network (E-UTRAN), a NextGen RAN (NG RAN), or some other type of RAN. The UEs 1101 and 1102 utilize connections 1103 and 1104, respectively. Each of the connections 1103 and 1104 includes a physical communications interface or layer (discussed in further detail below). In this embodiment, the connections 1103 and 1104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1101 and 1102 may further directly exchange communication data via a ProSe interface 1105. The ProSe interface 1105 may alternatively be referred to as a sidelink interface including one or more logical channels. The one or more logical channels include, but are not limited to, a Physical Sidelink Control Channel (PSCCH), a Physical Sidelink Shared Channel (PSSCH), a Physical Sidelink Discovery Channel (PSDCH) and a Physical Sidelink Broadcast Channel (PSBCH).

The UE 1102 is shown to be configured to access an access point (AP) 1106 via connection 1107. The connection 1107 may include a local wireless connection, such as a connection consistent with any IEEE 802.11 protocol, wherein the AP 1106 may include a wireless fidelity (Wi-Fi®) router. In this example, the AP 1106 is shown to be connected to the Internet without connecting to a core network 1120 of the wireless system 1100 (described in further detail below).

The RAN 1110 can include one or more access nodes that enable the connections 1103 and 1104. These access nodes (ANs) can be referred to as base stations (BSs), NodeBs, evolved NodeBs (eNBs), next Generation NodeBs (gNB), RAN nodes, and so forth, and can include ground stations (e.g., terrestrial access points) or satellite stations providing coverage within a geographic area (e.g., a cell). In some embodiments, the RAN 1110 may include one or more RAN nodes for providing macrocells, e.g., macro RAN node 1111, and one or more RAN nodes for providing femtocells or picocells (e.g., cells having smaller coverage areas, smaller user capacity, or higher bandwidth compared to macrocells), e.g., low power (LP) RAN node 1112.

Any one of the RAN nodes 1111 and 1112 can terminate the air interface protocol and can be the first point of contact for the UEs 1101 and 1102. In some embodiments, any one of the RAN nodes 1111 and 1112 can fulfill various logical functions for the RAN 1110 including, but not limited to, radio network controller (RNC) functions such as radio bearer management, uplink and downlink dynamic radio resource management and data packet scheduling, and mobility management.

According to some embodiments, the UEs 1101 and 1102 can be configured to communicate using Orthogonal Frequency-Division Multiplexing (OFDM) communication signals with each other or with any of the RAN nodes 1111 and 1112 over a multicarrier communication channel in accordance with various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications). It is noted that the scope of the embodiments is not limited in this respect. The OFDM signals may include a plurality of orthogonal subcarriers.

In some embodiments, a downlink resource grid can be used for downlink transmissions from any one of the RAN nodes 1111 and 1112 to the UEs 1101 and 1102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid includes a number of resource blocks, which describe the mapping of certain physical channels to resource elements. Each resource block includes a collection of resource elements; in the frequency domain, this may represent the smallest quantity of resources that can currently be allocated. There are several different physical downlink channels that are conveyed using such resource blocks.

The PDSCH may carry user data and higher-layer signaling to the UEs 1101 and 1102. The PDCCH may carry information about the transport format and resource allocations related to the PDSCH, among other things. The PDCCH may also inform the UEs 1101 and 1102 about the transport format, resource allocation, and H-ARQ (Hybrid Automatic Repeat Request) information related to the uplink shared channel. Typically, downlink scheduling (assigning control and shared channel resource blocks to a UE within a cell) may be performed at any of the RAN nodes 1111 and 1112 based on channel quality information fed back from any one of the UEs 1101 and 1102. The downlink resource assignment information may be sent on the PDCCH used for (e.g., assigned to) each of the UEs 1101 and 1102.

The PDCCH may use control channel elements (CCEs) to convey the control information. Before being mapped to resource elements, PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). One of the ECCEs may have other numbers of EREGs in some situations.

The RAN 1110 is shown to be communicatively coupled to the core network (CN) 1120 via an S1 interface 1113. In some embodiments, the CN 1120 may be an evolved packet core (EPC) network, a NextGen Packet Core (NPC) network, or some other type of CN. In this embodiment the S1 interface 1113 is split into two parts, including an S1-U interface 1114 and an S1-mobility management entity (MME) interface 1115. The S1-U interface 1114 carries traffic data between the RAN nodes 1111 and 1112 and a serving gateway (S-GW) 1122. The S1-MME interface 1115 is a signaling interface between the RAN nodes 1111 and 1112 and MMEs 1121.

In this embodiment, the CN 1120 includes the MMEs 1121, the S-GW 1122, a Packet Data Network (PDN) Gateway (P-GW) 1123, and a home subscriber server (HSS) 1124. The MMEs 1121 may be similar in function to the control plane of legacy Serving General Packet Radio Service (GPRS) Support Nodes (SGSN). The MMEs 1121 may manage mobility aspects in access such as gateway selection and tracking area list management. The HSS 1124 may include a database for network users, including subscription-related information to support the network entities' handling of communication sessions. The CN 1120 may include one or several HSSs 1124, depending on the number of mobile subscribers, on the capacity of the equipment, on the organization of the network, etc. For example, the HSS 1124 can provide support for routing/roaming, authentication, authorization, naming/addressing resolution, location dependencies, etc.

The S-GW 1122 terminates the S1 interface 1113 towards the RAN 1110, and routes data packets between the RAN 1110 and the CN 1120. In addition, the S-GW 1122 may be a local mobility anchor point for inter-RAN node handovers, and also may provide an anchor for inter-3GPP mobility. Other responsibilities of the S-GW 1122 may include lawful intercept, charging, and some policy enforcement.

The P-GW 1123 terminates an SGi interface toward a PDN. The P-GW 1123 routes data packets between the CN 1120 (e.g., the EPC network) and external networks such as a network including an application server 1130 (alternatively referred to as application function (AF)) via an Internet Protocol (IP) interface 1125. Generally, the application server 1130 may be an element offering applications that use IP bearer resources with the core network 1120 (e.g., UMTS Packet Services (PS) domain, LTE PS data services, etc.). In this embodiment, the P-GW 1123 is shown to be communicatively coupled to the application server 1130 via the IP interface 1125. The application server 1130 can also be configured to support one or more communication services (e.g., Voice-over-Internet Protocol (VoIP) sessions, PTT sessions, group communication sessions, social networking services, etc.) for the UEs 1101 and 1102 via the CN 1120.

In some embodiments, the P-GW 1123 may further be a node for policy enforcement and charging data collection. The CN 1120 may further include a policy and charging control element (e.g., Policy and Charging Enforcement Function (PCRF) 1126). In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1126 may be communicatively coupled to the application server 1130 via the P-GW 1123. The application server 1130 may signal the PCRF 1126 to indicate a new service flow and select appropriate Quality of Service (QoS) and charging parameters. The PCRF 1126 may provision this rule into a Policy and Charging Enforcement Function (PCEF) (not shown) with appropriate traffic flow template (TFT) and QoS class of identifier (QCI), which commences the QoS and charging as specified by the application server 1130.

Figure 12:
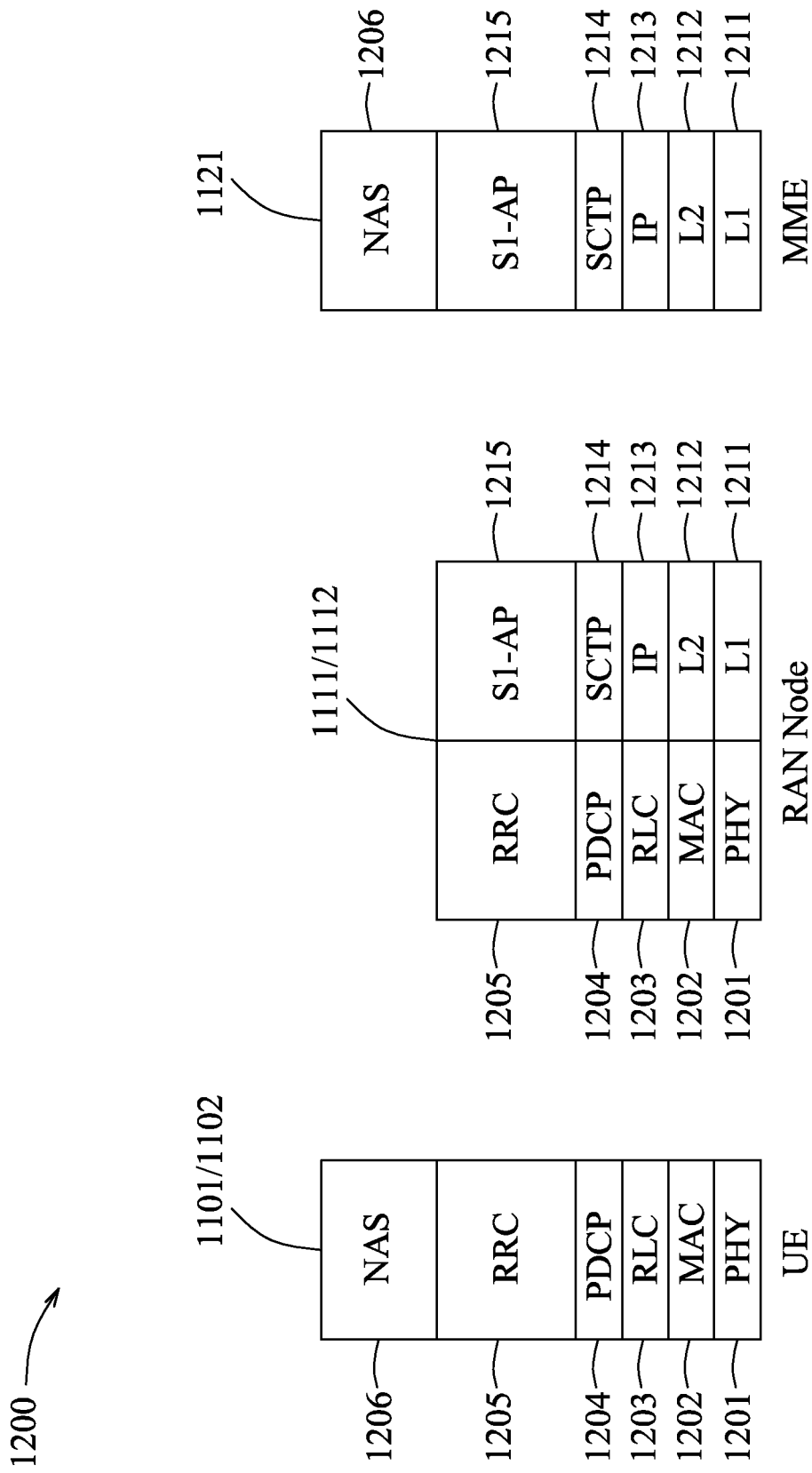
FIG. 12 illustrates an example of a control plane protocol stack according to some embodiments of this disclosure.

FIG. 12 illustrates an example of a control plane protocol stack according to some embodiments of this disclosure. In the example of FIG. 12, a control plane 1200 is shown as a communications protocol stack between the UE 1101 (or alternatively, the UE 1102), the RAN node 1111 (or alternatively, the RAN node 1112), and the MME 1121.

The PHY layer 1201 may transmit or receive information used by the MAC layer 1202 over one or more air interfaces. The PHY layer 1201 may further perform link adaptation or adaptive modulation and coding (AMC), power control, cell search (e.g., for initial synchronization and handover purposes), and other measurements used by higher layers, such as the RRC layer 1205. The PHY layer 1201 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1202 may perform mapping between logical channels and transport channels, multiplexing of MAC service data units (SDUs) from one or more logical channels onto transport blocks (TB) to be delivered to the PHY layer 1201 via transport channels, de-multiplexing MAC SDUs to one or more logical channels from transport blocks (TB) delivered from the PHY layer 1201 via transport channels, multiplexing MAC SDUs onto TBs, scheduling information reporting, error correction through hybrid automatic repeat request (HARQ), and logical channel prioritization.

The RLC layer 1203 may operate in a plurality of modes of operation, including Transparent Mode (TM), Unacknowledged Mode (UM) and Acknowledged Mode (AM). The RLC layer 1203 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1203 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1204 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1205 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE 1101 or 1102 and the E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. Said MIBs and SIBs may include one or more information elements (IEs), which may each comprise individual data fields or data structures.

The UE 1101 and the RAN node 1111 of FIG. 11 may utilize a Uu interface (e.g., an LTE-Uu interface) to exchange control plane data via a protocol stack including the PHY layer 1201, the MAC layer 1202, the RLC layer 1203, the PDCP layer 1204 and the RRC layer 1205.

The non-access stratum (NAS) protocols 1206 form the highest stratum of the control plane between the UE 1101 or 1102 and the MME 1121. The NAS protocols 1206 support the mobility of the UE 1101 or 1102 and the session management procedures to establish and maintain IP connectivity between the UE 1101 or 1102 and the P-GW 1123 (see FIG. 11).

The S1 Application Protocol (S1-AP) layer 1215 may support the functions of the S1 interface, and include Elementary Procedures (EPs). An EP is a unit of interaction between the RAN node 1111 or 1112 and the CN 1120 (see FIG. 11). The S1-AP layer 1215 provides services that may include two groups, i.e., UE-associated services and non UE-associated services. These services perform functions including, but not limited to, E-UTRAN Radio Access Bearer (E-RAB) management, UE capability indication, mobility, NAS signaling transport, RAN Information Management (RIM), and configuration transfer.

A Stream Control Transmission Protocol (SCTP) layer 1214 may ensure reliable delivery of signaling messages between the RAN node 1111 or 1112 and the MME 1121 based, in part, on the IP protocol supported by the IP layer 1213. An L2 layer 1212 and an L1 layer 1211 may refer to communication links (e.g., wired or wireless) used by the RAN node 1111 or 1112 and the MME 1121 to exchange information.

The RAN node 1111 and the MME 1121 may utilize an S1-MME interface to exchange control plane data via a protocol stack including the L1 layer 1211, the L2 layer 1212, the IP layer 1213, the SCTP layer 1214, and the S1-AP layer 1215.

Figure 13:
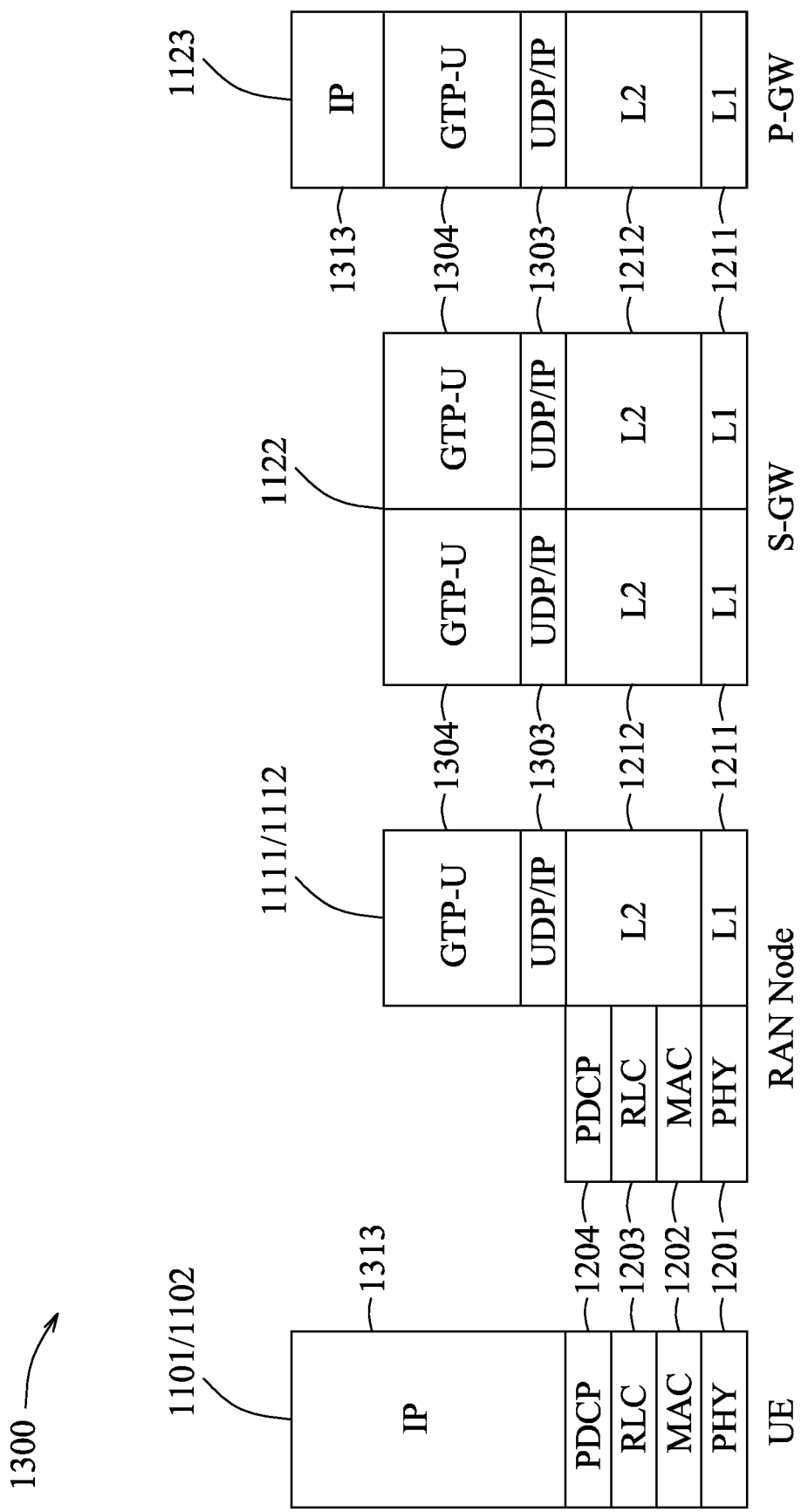
FIG. 13 illustrates an example of a user plane protocol stack according to some embodiments of this disclosure.

FIG. 13 illustrates an example of a user plane protocol stack according to some embodiments of this disclosure. In this example, a user plane 1300 is shown as a communications protocol stack between the UE 1101 (or alternatively, the UE 1102), the RAN node 1111 (or alternatively, the RAN node 1112), the S-GW 1122, and the P-GW 1123. The user plane 1300 may utilize at least some of the same protocol layers as the control plane 1200 of FIG. 12. For example, the UE 1101 or 1102 and the RAN node 1111 or 1112 may utilize a Uu interface (e.g., an LTE-Uu interface) to exchange user plane data via a protocol stack also including a PHY layer 1201, a MAC layer 1202, an RLC layer 1203 and a PDCP layer 1204 (see FIG. 12). The protocol stack for the UE 1101 or 1102 may further include an IP layer 1313.

A General Packet Radio Service (GPRS) Tunneling Protocol for the user plane (GTP-U) layer 1304 may be used for carrying user data within the GPRS core network and between the radio access network and the core network. The user data transported can be packets in any of IPv4, IPv6, or PPP formats. A UDP and IP security (UDP/IP) layer 1303 may provide checksums for data integrity, port numbers for addressing different functions at the source and destination, and encryption and authentication on the selected data flows. The RAN node 1111 or 1112 and the S-GW 1122 may utilize an S1-U interface to exchange user plane data via a protocol stack including the L1 layer 1211, the L2 layer 1212, the UDP/IP layer 1303, and the GTP-U layer 1304. The S-GW 1122 and the P-GW 1123 may utilize an S5/S8a interface to exchange user plane data via a protocol stack including the L1 layer 1211, the L2 layer 1212, the UDP/IP layer 1303, and the GTP-U layer 1304. The protocol stack for the P-GW 1123 may further include the IP layer 1313. As discussed above with respect to FIG. 12, NAS protocols support the mobility of the UE 1101 or 1102 and the session management procedures to establish and maintain IP connectivity between the UE 1101 or 1102 and the P-GW 1123.

Figure 14:
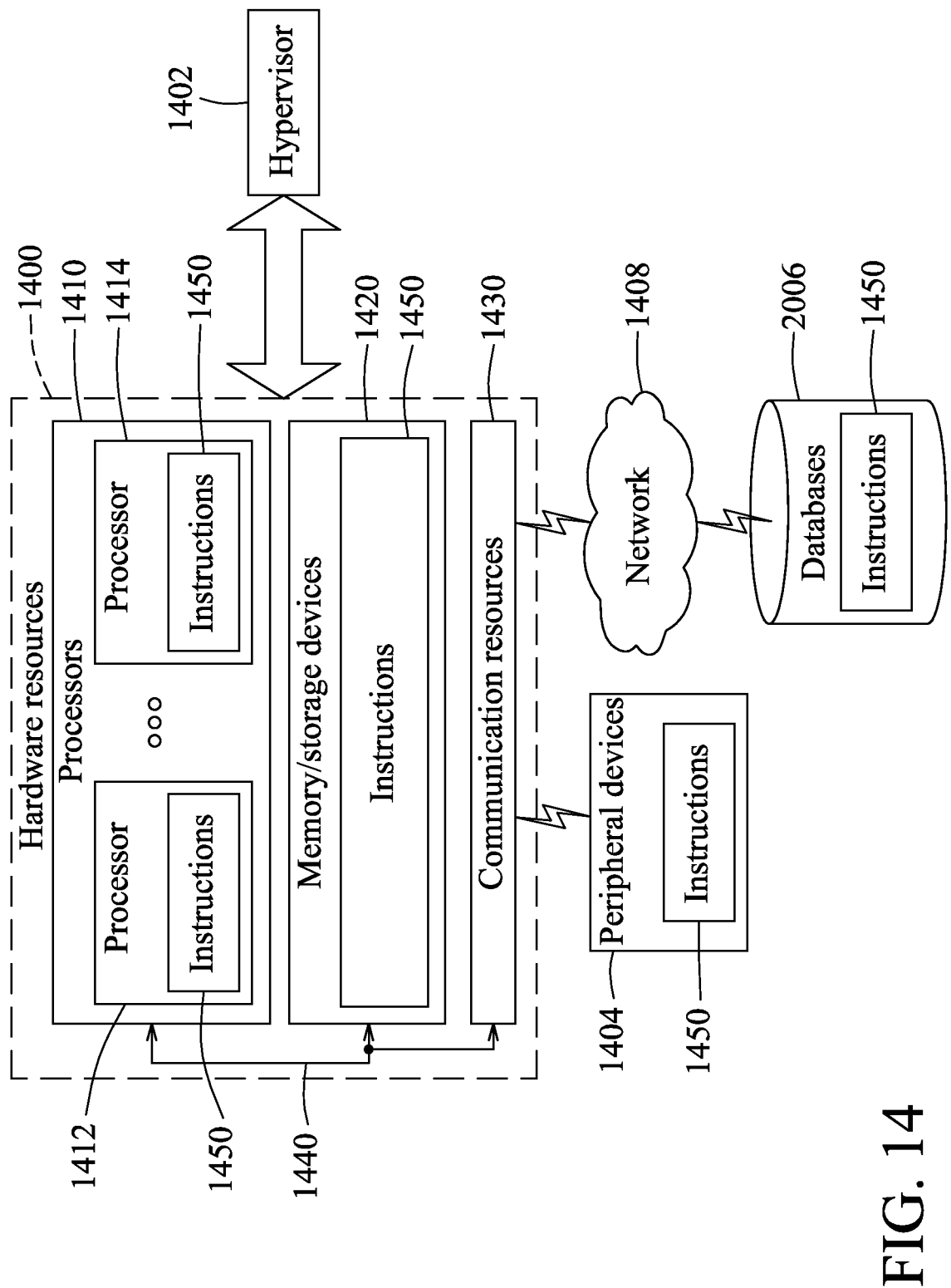
FIG. 14 is a block diagram illustrating components, according to some example embodiments, able to read instructions from a machine-readable or computer-readable medium and perform any one or more of the methodologies discussed herein.

FIG. 14 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources 1400 including one or more processors (or processor cores) 1410, one or more memory/storage devices 1420, and one or more communication resources 1430, each of which may be communicatively coupled via a bus 1440. For embodiments where node virtualization (e.g., NFV) is utilized, a hypervisor 1402 may be executed to provide an execution environment for one or more network slices/sub-slices to utilize the hardware resources 1400.

The processors 1410 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1412 and a processor 1414.

The memory/storage devices 1420 may include main memory, disk storage, or any suitable combination thereof. The memory/storage devices 1420 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), flash memory, solid-state storage, etc.

The communication resources 1430 may include interconnection or network interface components or other suitable devices to communicate with one or more peripheral devices 1404 or one or more databases 1406 via a network 1408. For example, the communication resources 1430 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1450 may comprise software, a program, an application, an applet, an app, or other executable code for causing at least any of the processors 1410 to perform any one or more of the methodologies discussed herein. The instructions 1450 may reside, completely or partially, within at least one of the processors 1410 (e.g., within the processor's cache memory), the memory/storage devices 1420, or any suitable combination thereof. Furthermore, any portion of the instructions 1450 may be transferred to the hardware resources 1400 from any combination of the peripheral devices 1404 or the databases 1406. Accordingly, the memory of the processors 1410, the memory/storage devices 1420, the peripheral devices 1404, and the databases 1406 are examples of computer-readable and machine-readable media.

Examples

The following examples pertain to specific technology embodiments and point out specific features, elements, or actions that can be used or otherwise combined in achieving such embodiments.

Example 1 is an apparatus for generating a frequency hopping sequence in an unlicensed Internet-of-Things (IoT) system. The apparatus includes baseband circuitry that includes one or more processors to generate a frequency hopping sequence by conducting a permutation operation based on a physical cell identifier (PCI) and a system frame number (SFN), and to select a channel within an unlicensed spectrum according to the frequency hopping sequence. The baseband circuitry further includes a memory interface to receive data identifying at least one of the PCI or the SFN.

Example 2 is the apparatus of Example 1, wherein the one or more processors are to conduct two separate permutation operations to generate two sequences, respectively, and to conduct a logical combination of the two sequences to generate the frequency hopping sequence.

Example 3 is the apparatus of Example 2, wherein, for each of the two separate permutation operations, the one or more processors are further to obtain one of a most significant bit, a least significant bit, an odd bit and an even bit of the SFN as a first parameter, to generate a second parameter based on a function of the PCI and the SFN, and to conduct the permutation operation using the first parameter and the second parameter respectively as input and control of the permutation operation.

Example 4 is the apparatus of Example 3, wherein the one or more processors are to generate the second parameter based on:

$Y = PCI \times 32 + SFN'$; and $SFN' = floor[(SFN + eFrame \times 1024)/8]$, where Y is the second parameter, eFrame is the least significant 3 bits of a hyperframe index, and floor denotes a flooring function.

Example 5 is the apparatus of Example 4, wherein the one or more processors are to generate the frequency hopping sequence $\Phi(xi)$ with xi expressed by:

$xi = \{Perm5(SFN'_{10,8,6,4,2}, Y) \text{ XOR } Perm5(\text{NOT } SFN'_{9,7,5,3,1}, \text{NOT } Y)\} \mod |\Phi| + 1$, where $|\Phi|$ denotes dimension of the frequency hopping sequence, and the notation of $X_{N1,N2,N3,N4,N5}$ denotes the $N1^{th}$, $N2^{th}$, $N3^{th}$, $N4^{th}$ and $N5^{th}$ least significant bits of parameter X in binary form.

Example 6 is the apparatus of Example 2, wherein, for each of the two separate permutation operations, the one or more processors are further to obtain one of a most significant bit, a least significant bit, an odd bit and an even bit of the SFN as a first parameter, to generate a second parameter based on a pseudorandom number generator using the PCI as a seed, and to conduct the permutation operation using the first parameter and the second parameter respectively as input and control of the permutation operation.

Example 7 is the apparatus of Example 6, wherein the one or more processors are to generate the second parameter based on $Y=1-[\Psi]$, where Y is the second parameter, $\Psi$ denotes initial 14 values generated by the pseudorandom number generator with the seed equal to the PCI, and $[\Psi]$ indicates an operation of rounding $\Psi$.

Example 8 is the apparatus of Example 7, wherein the one or more processors are to generate the frequency hopping sequence $\Phi(xi)$ with xi expressed by:

$xi = \{Perm5(SFN'_{10,8,6,4,2}, Y) \text{ XOR } Perm5(SFN'_{9,7,5,3,1}, Y)\} \mod |\Phi| + 1$; and $SFN' = floor[(SFN + eFrame \times 1024)/8]$, where eFrame is the least significant 3 bits of a hyperframe index, the notation of $X_{N1,N2,N3,N4,N5}$ denotes the $N1^{th}$, $N2^{th}$, $N3^{th}$, $N4^{th}$ and $N5^{th}$ least significant bits of parameter X in binary form, and floor denotes a flooring function.

Example 9 is the apparatus of Example 1, wherein the one or more processors are to generate the frequency hopping sequence $\Phi(xi)$ with $xi = Perm5(z, P)+1$, where parameter z is a combination of the PCI and the SFN, and parameter P is a function of the PCI, the SFN and a total number of frequency channels.

Example 10 is the apparatus of Example 9, wherein the one or more processors are to calculate the parameter z based on one of the following equations:

$z = \{SFN'_{1,2,3,4,5} + PCI_{1,2,3,4,5} + PCI_{5,6,7,8,9}\} \mod N$; and $z = \{SFN'_{1,2,3,4,5} + PCI_{1,2,3,4,5} \text{ XOR } SFN'_{6,7,8,9,10}\} \mod N$, where $SFN' = floor[(SFN + eFrame \times 1024)/8]$, N is the total number of frequency channels, eFrame is the least significant 3 bits of a hyperframe index, the notation of $X_{N1,N2,N3,N4,N5}$ denotes the $N1^{th}$, $N2^{th}$, $N3^{th}$, $N4^{th}$ and $N5^{th}$ least significant bits of parameter X in binary form, and floor denotes a flooring function.

Example 11 is the apparatus of Example 10, wherein the one or more processors are to calculate the parameter P based on:

$P = P'$ if $N=32$;

$P = P'$ with $P'_{11,9,8,5,4} = [0,0,0,0,0]$ if $N=16$; and $P' = \{PCI + SFN'_{6,7,8,9,10} + 512 \times SFN'_{6,7,8,9,10} + N \times (N-16)/16 + SFN'_5 \times (32-N) \times 32\} \mod 2^{14}$.

Example 12 is the apparatus of Example 10, wherein the one or more processors are to calculate the parameter P based on:

$P = P'$ if $N=32$;

$P = P'$ with $P'_{11,9,8,5,4} = [0,0,0,0,0]$ if $N=16$; and $P' = PCI + 512 \times SFN'_{6,7,8,9,10}$.

Example 13 is the apparatus of Example 9, wherein the one or more processors are to calculate the parameter z based on:

$z = \{SFN'_{y1,y2,y3,y4,y5} + PCI_{1,2,3,4,5} + PCI_{5,6,7,8,9}\} \mod N$; and $SFN' = floor[(SFN + eFrame \times 1024)/8]$, where N is the total number of frequency channels, eFrame is the least significant 3 bits of a hyperframe index, the notation of $X_{N1,N2,N3,N4,N5}$ denotes the $N1^{th}$, $N2^{th}$, $N3^{th}$, $N4^{th}$ and $N5^{th}$ least significant bits of parameter X in binary form, parameters y1, y2, y3, y4 and y5 are elements in a permutation of $\{1, 2, 3, 4, 5\}$, and floor denotes a flooring function.

Example 14 is the apparatus of Example 13, wherein the one or more processors are to set the parameter y5 to 5.

Example 15 is the apparatus of Example 13, wherein the one or more processors are to set the parameters y1, y2, y3, y4 and y5 to two different permutations of $\{1, 2, 3, 4, 5\}$ when the total number of frequency channels is 16 and when the total number of frequency channels is 32, respectively.

Example 16 is the apparatus of Example 13, wherein the one or more processors are to determine values respectively of the parameters y1, y2, y3, y4 and y5 according to at least two bits of the SFN.

Example 17 is the apparatus of Example 16, wherein the one or more processors are to determine the values of the parameters y1, y2, y3, y4 and y5 by a circular shift of a predetermined sequence according to at least two bits of the SFN.

Example 18 is the apparatus of Example 1, wherein the one or more processors are further to generate a parameter using a pseudorandom number generator, and to conduct the permutation operation using the parameter as control of the permutation operation.

Example 19 is the apparatus of Example 18, wherein the one or more processors are to generate the parameter using one of Mersenne Twister, a lagged Fibonacci generator and a multiple recursive generator.

Example 20 is the apparatus of Example 1, wherein the one or more processors are to conduct the permutation operation of Perm5 to generate the frequency hopping sequence.

Example 21 is the apparatus of Example 1, wherein the one or more processors are to: conduct a 4-bit permutation operation on four input bits with eight control bits to generate an output sequence with four bits, the 4-bit permutation operation having 4 stages each including 2 cells, each cell to permute two of the input bits by swapping the two of the input bits or directly outputting the two of the input bits; and generate the frequency hopping sequence based on the output sequence.

Example 22 is the apparatus of Example 1, wherein the one or more processors are to generate all possible permutations of indices respectively of frequency channels, to select a predetermined number of unique sequences from the possible permutations, and to generate the frequency hopping sequence based on the unique sequences.

Example 23 is the apparatus of Example 22, wherein the one or more processors are to generate the possible permutations of the frequency channels as a matrix with dimension (N×N!), where N is the total number of the frequency channels, and to select each of the unique sequences by selecting a specific element of the matrix according to the PCI and the SFN.

Example 24 is the apparatus of Example claim 23, wherein the one or more processors are to generate the frequency hopping sequence expressed by:

$$\psi\{[PCI+floor(SFN'/|\Phi|)] \bmod N+1, SFN' \bmod |\Phi|+1\},$$

where $\psi$ is the matrix of possible permutations of the frequency channels, SFN'=floor[(SFN+eFrame×1024)/8], eFrame is the least significant 3 bits of a hyperframe index, $|\Phi|$ denotes dimension of the frequency hopping sequence, and floor denotes a flooring function.

While the present techniques have been described with respect to a limited number of embodiments, those skilled in the art can appreciate numerous modifications and variations therefrom. It is intended that the appended claims cover all such modifications and variations as falling within the true spirit and scope of the present techniques.

In the foregoing specification, a detailed description has been given with reference to specific embodiments. It can, however, be evident that various modifications and changes may be made thereto without departing from the broader spirit and scope of the present techniques as set forth in the appended claims. The specification and drawings are, accordingly, to be regarded in an illustrative sense rather than a restrictive sense. Furthermore, the foregoing use of embodiments and other language does not necessarily refer to the same embodiment or the same example, but may refer to different and distinct embodiments, as well as potentially the same embodiment.

What is claimed is:

1. An apparatus for generating a frequency hopping sequence in an unlicensed Internet-of-Things (IoT) system, the apparatus comprising: a baseband circuitry that includes:
   one or more processors to generate a frequency hopping sequence by conducting a permutation operation based on a physical cell identifier (PCI) and a system frame number (SFN), and to select a channel within an unlicensed spectrum according to the frequency hopping sequence; and
   a memory interface to receive data identifying at least one of the PCI or the SFN,
   wherein the one or more processors are to:
   conduct two separate permutation operations to generate two sequences, respectively; and
   conduct a logical combination of the two sequences to generate the frequency hopping sequence.

2. The apparatus as claimed in claim 1, wherein, for each of the two separate permutation operations, the one or more processors are further to obtain one of a most significant bit, a least significant bit, an odd bit and an even bit of the SFN as a first parameter, to generate a second parameter based on a function of the PCI and the SFN, and to conduct the permutation operation using the first parameter and the second parameter respectively as input and control of the permutation operation.

3. The apparatus as claimed in claim 2, wherein the one or more processors are to generate the second parameter based on:

$$Y=PCI \times 32+SFN'; \text{ and}$$

$$SFN'=floor[(SFN+eFrame \times 1024)/8],$$

where Y is the second parameter, eFrame is the least significant 3 bits of a hyperframe index, and floor denotes a flooring function.

4. The apparatus as claimed in claim 3, wherein the one or more processors are to generate the frequency hopping sequence $\Phi(xi)$ with xi expressed by:

$$xi=\{Perm5(SFN'_{10,8,6,4,2}, Y) XOR \quad Perm5(NOT\ SFN'_{9,7,5,3,1}, NOT\ Y)\} \bmod |\Phi|+1,$$

where $|\Phi|$ denotes dimension of the frequency hopping sequence, and the notation of $X_{N1,N2,N3,N4,N5}$ denotes the $N1^{th}$, $N2^{th}$, $N3^{th}$, $N4^{th}$ and $N5^{th}$ least significant bits of parameter X in binary form.

5. The apparatus as claimed in claim 1, wherein, for each of the two separate permutation operations, the one or more processors are further to obtain one of a most significant bit, a least significant bit, an odd bit and an even bit of the SFN as a first parameter, to generate a second parameter based on a pseudorandom number generator using the PCI as a seed, and to conduct the permutation operation using the first parameter and the second parameter respectively as input and control of the permutation operation.

6. The apparatus as claimed in claim 5, wherein the one or more processors are to generate the second parameter based on Y=1−[Ψ], where Y is the second parameter, Ψ denotes initial 14 values generated by the pseudorandom number generator with the seed equal to the PCI, and [Ψ] indicates an operation of rounding Ψ.

7. The apparatus as claimed in claim 6, wherein the one or more processors are to generate the frequency hopping sequence $\Phi(xi)$ with xi expressed by:

$$xi=\{Perm5(SFN'_{10,8,6,4,2}, Y) XOR \quad Perm5(NOT\ SFN'_{9,7,5,3,1}, NOT\ Y)\} \bmod |\Phi|+1; \text{ and}$$

$$SFN'=floor[(SFN+eFrame \times 1024)/8],$$

where eFrame is the least significant 3 bits of a hyperframe index, the notation of $X_{N1,N2,N3,N4,N5}$ denotes the $N1^{th}$, $N2^{th}$, $N3^{th}$, $N4^{th}$ and $N5^{th}$ least significant bits of parameter X in binary form, and floor denotes a flooring function.

8. An apparatus for generating a frequency hopping sequence in an unlicensed Internet-of-Things (IoT) system, the apparatus comprising: a baseband circuitry that includes:
   one or more processors to generate a frequency hopping sequence by conducting a permutation operation based on a physical cell identifier (PCI) and a system frame number (SFN), and to select a channel within an unlicensed spectrum according to the frequency hopping sequence; and
   a memory interface to receive data identifying at least one of the PCI or the SFN, wherein the one or more processors are to generate the frequency hopping sequence Φ(xi) with xi=Perm5(z, P)+1, where parameter z is a combination of the PCI and the SFN, and parameter P is a function of the PCI, the SFN and a total number of frequency channels.

9. The apparatus as claimed in claim 8, wherein the one or more processors are to calculate the parameter z based on one of the following equations:

$$z=\{SFN'_{1,2,3,4,5}+PCI_{1,2,3,4,5}+PCI_{5,6,7,8,9}\} \bmod N;\text{ and}$$

$$z=\{SFN'_{1,2,3,4,5}+PCI_{1,2,3,4,5} \text{XOR } SFN'_{6,7,8,9,10}\} \bmod N,$$

where SFN'=floor[(SFN+eFrame×1024)/8], N is the total number of frequency channels, eFrame is the least significant 3 bits of a hyperframe index, the notation of $X_{N1,N2,N3,N4,N5}$ denotes the N1$^{th}$, N2$^{th}$, N3$^{th}$, N4$^{th}$ and N5$^{th}$ least significant bits of parameter X in binary form, and floor denotes a flooring function.

10. The apparatus as claimed in claim 9, wherein the one or more processors are to calculate the parameter P based on:

$$P=P' \text{ if } N=32;$$

$$P=P' \text{ with } P_{11,9,8,5,4}=[0,0,0,0,0] \text{ if } N=16; \text{ and}$$

$$P'=\{PCI+SFN'_{6,7,8,9,10}+512\times SFN'_{6,7,8,9,10}+N\times(N-16)/16+SFN'_5\times(32-N)\times 32\} \bmod 2^{14}.$$

11. The apparatus as claimed in claim 9, wherein the one or more processors are to calculate the parameter P based on:

$$P=P' \text{ if } N=32;$$

$$P=P' \text{ with } P_{11,9,8,5,4}=[0,0,0,0,0] \text{ if } N=16; \text{ and}$$

$$P'=PCI+512\times SFN'_{6,7,8,9,10}.$$

12. The apparatus as claimed in claim 8, wherein the one or more processors are to calculate the parameter z based on:

$$z=\{SFN'_{y1,y2,y3,y4,y5}+PCI_{1,2,3,4,5}+PCI_{5,6,7,8,9}\} \bmod N; \text{ and}$$

$$SFN'=\text{floor}[(SFN+eFrame\times 1024)/8],$$

where N is the total number of frequency channels, eFrame is the least significant 3 bits of a hyperframe index, the notation of $X_{N1,N2,N3,N4,N5}$ denotes the N1$^{th}$, N2$^{th}$, N3$^{th}$, N4$^{th}$ and N5$^{th}$ least significant bits of parameter X in binary form, parameters y1, y2, y3, y4 and y5 are elements in a permutation of {1, 2, 3, 4, 5}, and floor denotes a flooring function.

13. The apparatus as claimed in claim 12, wherein the one or more processors are to set the parameter y5 to 5.

14. The apparatus as claimed in claim 12, wherein the one or more processors are to set the parameters y1, y2, y3, y4 and y5 to two different permutations of {1, 2, 3, 4, 5} when the total number of frequency channels is 16 and when the total number of frequency channels is 32, respectively.

15. The apparatus as claimed in claim 12, wherein the one or more processors are to determine values respectively of the parameters y1, y2, y3, y4 and y5 according to at least two bits of the SFN.

16. The apparatus as claimed in claim 15, wherein the one or more processors are to determine the values of the parameters y1, y2, y3, y4 and y5 by a circular shift of a predetermined sequence according to at least two bits of the SFN.

17. An apparatus for generating a frequency hopping sequence in an unlicensed Internet-of-Things (IoT) system, the apparatus comprising: a baseband circuitry that includes:
one or more processors to generate a frequency hopping sequence by conducting a permutation operation based on a physical cell identifier (PCI) and a system frame number (SFN), and to select a channel within an unlicensed spectrum according to the frequency hopping sequence; and
a memory interface to receive data identifying at least one of the PCI or the SFN,
wherein the one or more processors are to generate all possible permutations of indices respectively of frequency channels, to select a predetermined number of unique sequences from the possible permutations, and to generate the frequency hopping sequence based on the unique sequences.

18. The apparatus as claimed in claim 17, wherein the one or more processors are to generate the possible permutations of the frequency channels as a matrix with dimension (N×N!), where N is the total number of the frequency channels, and to select each of the unique sequences by selecting a specific element of the matrix according to the PCI and the SFN.

19. The apparatus as claimed in claim 18, wherein the one or more processors are to generate the frequency hopping sequence expressed by:

$$\psi\{[PCI+\text{floor}(SFN'/|\Phi|)] \bmod N+1, SFN' \bmod |\Phi|+1\},$$

where ψ is the matrix of possible permutations of the frequency channels, SFN'=floor[(SFN+eFrame×1024)/8], eFrame is the least significant 3 bits of a hyperframe index, |Φ| denotes dimension of the frequency hopping sequence, and floor denotes a flooring function.

20. A non-transitory computer-readable storage medium that stores instructions for execution by one or more processors of an apparatus for generating a frequency hopping sequence, the operations to configure the one or more processors to:
generate a frequency hopping sequence by conducting a permutation operation based on a physical cell identifier (PCI) and a system frame number (SFN);
select a channel within an unlicensed spectrum according to the frequency hopping sequence;
receive data identifying at least one of the PCI or the SFN at a memory interfaces;
conduct a 4-bit permutation operation on four input bits with eight control bits to generate an output sequence with four bits, the 4-bit permutation operation having 4 stages each including 2 cells, each cell to permute two of the input bits by swapping the two of the input bits or directly outputting the two of the input bits; and
generate the frequency hopping sequence based on the output sequence.

* * * * *